United States Patent
Cholas et al.

(10) Patent No.: US 9,451,381 B2
(45) Date of Patent: Sep. 20, 2016

(54) AUTOMATED PROVISIONING OF MANAGED SERVICES IN A WI-FI CAPABLE CLIENT DEVICE

(71) Applicant: Time Warner Cable Enterprises LLC, New York, NY (US)

(72) Inventors: Chris A. Cholas, Frederick, CO (US); Eric D Hybertson, Longmont, CO (US); Michael B Detty, Denver, CO (US); Joel C Tyus, Centennial, CO (US); Eduardo Cardona, Broomfield, CO (US)

(73) Assignee: TIME WARNER CABLE ENTERPRISES LLC, New York, NY (US)

(*) Notice: Subject to any disclaimer, the term of this patent is extended or adjusted under 35 U.S.C. 154(b) by 219 days.

(21) Appl. No.: 13/960,575

(22) Filed: Aug. 6, 2013

(65) Prior Publication Data

US 2015/0043377 A1 Feb. 12, 2015

(51) Int. Cl.
*H04W 4/00* (2009.01)
*H04W 48/20* (2009.01)
*H04W 48/08* (2009.01)

(52) U.S. Cl.
CPC ............ *H04W 4/001* (2013.01); *H04W 48/20* (2013.01); *H04W 48/08* (2013.01)

(58) Field of Classification Search
None
See application file for complete search history.

(56) References Cited

U.S. PATENT DOCUMENTS

| | | | |
|---|---|---|---|
| 7,535,880 B1* | 5/2009 | Hinman et al. | 370/338 |
| 8,948,810 B2* | 2/2015 | Centoza | H04W 28/08 455/445 |
| 2005/0260973 A1* | 11/2005 | van de Groenendaal | H04L 63/102 455/411 |
| 2006/0153122 A1* | 7/2006 | Hinman et al. | 370/328 |
| 2008/0008125 A1* | 1/2008 | Pham | H04W 12/04 370/329 |
| 2009/0318193 A1* | 12/2009 | Littlefield | H04W 24/04 455/561 |
| 2010/0180016 A1* | 7/2010 | Bugwadia et al. | 709/220 |
| 2011/0264730 A1* | 10/2011 | Dattagupta | H04L 12/2809 709/203 |
| 2013/0079023 A1* | 3/2013 | Zhang | H04L 12/66 455/445 |
| 2013/0210416 A1* | 8/2013 | Duan | H04W 28/20 455/418 |
| 2014/0040444 A1* | 2/2014 | Lee et al. | 709/222 |
| 2014/0056131 A1* | 2/2014 | Song | H04W 28/0289 370/230 |
| 2014/0119280 A1* | 5/2014 | Azizi et al. | 370/328 |
| 2014/0126356 A1* | 5/2014 | Lee et al. | 370/228 |
| 2014/0269648 A1* | 9/2014 | Unnimadhavan | H04W 8/12 370/338 |
| 2014/0337950 A1* | 11/2014 | Yang et al. | 726/7 |

* cited by examiner

*Primary Examiner* — Brandon Renner
*Assistant Examiner* — Deepa Belur
(74) *Attorney, Agent, or Firm* — Straub & Pokotylo; Michael P. Straub; Abbas Zaidi

(57) ABSTRACT

Methods and apparatus for deploying and configuring WiFi capable devices are described. A WiFi capable device such as security camera, temperature monitor and/or other device intended for use with a home network including a gateway device is preconfigured with WiFi network connection information, e.g., a network identifier such as a first SSID corresponding to a first WiFi LAN network used to supply configuration information. The gateway device is preconfigured to act as an access point for the configuration network to which the first SSID corresponds. The gateway device also supports one or more additional LAN networks, e.g., home networks which can be used for data traffic. The additional LAN networks may include an Ethernet network, a coax cable network, a powerline network and/or an additional WiFi network corresponding to a second SSID. A WiFi capable device is configured via the first network to communicate traffic data via the second network.

16 Claims, 18 Drawing Sheets

AUTOMATED PROVISIONING OF MANAGED SERVICES IN A WI-FI CAPABLE CLIENT DEVICE

FIELD

Various embodiments, relate to communications, and more particularly, to methods and apparatus for deploying and configuring Wi-Fi capable devices.

BACKGROUND

Wi-Fi networks are becoming more widely used, and many new Wi-Fi capable devices are being deployed in the home/office. Many sites, e.g., homes and/or offices, already have a gateway which supports WiFi communications. Typical installation of a new WiFi devices involves user intervention of a customer and/or technician. A WPS (Wi-Fi protected setup) button exists on some devices, but it requires the user to physically press a button on the gateway and pair it with a device. Typically, the user would need to manually enter an SSID, e.g., obtained from packing provided with a WiFi gateway, and/or manually perform other steps to configure a new device to operate with an existing gateway device.

While the SSID to which a gateway device is initially configured may be indicated on the gateway device, e.g., via a label attached thereto, users often change the original SSID to one of their choosing for added security. Thus, after being deployed in a home the original SSID assigned to the gateway may not longer be valid due to a customer resetting the SSID.

It would be advantageous if methods and apparatus were developed which allowed a new device to automatically configure at a customer premise via WiFi signaling without having to know an SSID of a customer's home network which provides access to personal data stored on devices attached to the customer's home network and without having to know a network security parameter relating to the home network used at the home for Internet or home network access.

SUMMARY

Methods and apparatus for deploying and configuring WiFi capable devices are described. A WiFi capable device, e.g., an 802.11 compliant device, such as security camera, temperature monitor and/or other device intended for use with a home network including a gateway device is preconfigured with WiFi network connection information, e.g., a network identifier such as a first SSID (Service Set Identifier) corresponding to a first WiFi LAN network, e.g., a WiFi LAN network used to supply configuration information. The gateway device is preconfigured to act as an access point for the configuration network to which the SSID corresponds. The gateway device also supports one or more additional LAN networks, e.g., home networks which can be used for data traffic such as video and/or audio corresponding to content which may be delivered or communicated via the gateway device to or from another device, e.g., in the home network or attached to the Internet. The additional LAN networks may include an Ethernet network, a coax cable based network, a power line network and/or an additional WiFi network corresponding to a second SSID.

The gateway devices and WiFi devices are supplied, leased or configured in a predetermined manner, e.g., by a cable company and/or other entity that supplies or controls the deployment of the WiFi capable devices and the configuration of the home gateways. In some embodiments the WiFi capable devices are leased devices which are supplied by the same company, e.g., cable network or other Internet service access provider, that supplies a customer, at whose location the gateway and WiFi capable device is to be deployed.

In various embodiments, WiFi capable devices, such as cameras, temperature sensors, smoke alarms, home alarm controller and/or other WiFi capable devices which may be supplied to a customer for use with a gateway device, e.g., a cable gateway device which provides connectivity to the Internet, is preconfigured to connect to the WiFi LAN supported by the home gateway devices with the gateway device being preconfigured to act as an access point for the local WiFi network to which the first SSID for the configuration network corresponds.

The preconfigured devices are intended, in at least some embodiments, for use at customer premises, e.g., households or offices of customers, where a compatible WiFi gateway has been installed. In some embodiments the WiFi gateway is a cable network gateway which provides Internet access via a cable network connection to devices coupled to the gateway via one or more gateway supported LANs, e.g., a LAN WiFi network used to provide data services, a powerline network, an Ethernet and/or a home coax cable based network, e.g., a network using a MOCA interface. As mentioned above in various embodiments, in addition to supporting the various local networks used to support data traffic, e.g., video, audio and/or other services that may be provided, the WiFi gateway device is preconfigured to support a WiFi LAN used for configuration purposes which uses an SSID preprogrammed into the WiFi capable devices which are intended to be used with the WiFi gateway. The gateway may, and in some embodiments does, act as a policy enforcement restricting communications and signaling over the configuration LAN to communications relating to device set up and provisioning.

Upon initial power up and/or at periodic or predetermined times thereafter, a WiFi capable device implemented in accordance with the invention automatically establishes a connection with a WiFi capable gateway supporting the SSID corresponding to the configuration network. The initial contact uses the SSID that was pre-stored in the WiFi capable device and which is known and used by the gateway as the SSID of a LAN used for device configuration related signaling and information but, at least in some embodiments, not for other traffic or data such as video recorded by a camera or data relating to an application running on the WiFi capable device.

In various embodiments the home gateway device broadcasts the SSID (network identifier) of the WiFi network to be used for traffic data, e.g., video, audio and/or other data but is configured not to transmit the SSID of the configuration network being used. By controlling the home gateways by disabling the transmission of the SSID of the configuration network, the risk of malicious attaches against the LAN network identified by the preprogrammed SSID corresponding to the network to be used for device configuration is reduced since detection of the configuration LAN SSID from broadcast discovery information is not possible since the gateway does not transmit the configuration network SSID in a discovery signal.

In some embodiments the SSID of the LAN configuration network is predetermined and may be fixed or set by the supplier, e.g., leasing entity, of the WiFi capable devices and gateways equipment. A list of SSIDs may be preloaded in WiFi capable devices with the device being preprogrammed to connect to try connecting to the configuration networks. When a device detects that multiple connections are possible based on responses to signals transmitted using the SSIDs of the various configuration networks, at least in one embodiment the WiFi capable device decides to establish a connection using the SSID of the configuration network with the strongest signal strength from the perspective of the WiFi capable device. This allows multiple different configuration network SSIDs to be used reducing the risk of conflicts between gateways in adjoining customer premises while still allowing automatic network connection establishment. Since the WiFi device will attempt to connect to the configuration network from which the strongest response is received, it will likely attach to the network of the customer premise in which it is located since due to proximity and other reasons that is likely to be the strongest signal.

In various embodiments once a connection is established with a gateway device using a configuration network ID, a DHCP query is made. In response the gateway provides IP address information, e.g. an assigned IP address, which can be used to interact with other devices, e.g., devices connected to the Internet using IP signaling.

Having received the information required for IP connectivity from the gateway device, the WiFi capable device proceeds to send a service request using IP signaling to an initial configuration server. The IP signaling is communicated via the WiFi configuration network corresponding to the configuration SSID for signal to the gateway which then routes the configuration request via a communications network, e.g., cable network and/or Internet connection of a service configuration server. The configuration server is sometimes referred to as an initial configuration server (ICS) since it provides initial configuration information to devices seeking to be configured for services that are to be provided via the gateway. The configuration server may and in various embodiments also supplies subsequent configuration information, e.g., in response to subsequent requests from the WiFi capable device, e.g., periodic update configuration requests. The configuration server sends the WiFi capable device configuration information including information on the network to be used for traffic relating to the service for which the WiFi device is being configured. The network information may and normally does, identify a network other than the WiFi configuration network to be used by the WiFi capable device. The other network may be the WiFi network supported by the gateway for traffic in which case the configuration parameters include the SSID of the traffic network. Alternatively, the WiFi capable device may include a network interface such as an Ethernet interface for communications with the gateway device or another device via an Ethernet connection in which case the configuration information may specify that the Ethernet interface that should be used for communications with respect to the service being configured. In the case of a camera or other device likely to produce a large amount of data traffic the Ethernet connection may be preferred because of the relatively high data rate it can support when it is available.

In addition to supplying configuration information to the WiFi capable device the configuration server sends configuration information to the gateway device which is used to configure the gateway to support traffic corresponding to the service to be provided to the WiFi capable device. The configuration information may indicate filtering to be performed in the gateway and/or indicate one or more control servers which the gateway device is to respond to with regard to the service being provisioned, e.g., alarm system servers which may make requests for video data stored on the gateway in response to a signal indicating an alarm condition.

Once both the WiFi capable device and the gateway are configured for the service to be supported, a service flow is initiated with the WiFi capable device connecting to the network, e.g., WiFi network indicated by the SSID provided for traffic data. Once the gateway device detects the WiFi capable device signing onto the second network as part of obtaining the service to be performed it notifies the configuration server of the connection. The configuration server then sends a signal to a service provider server indicating that service is to be provided to the new WiFi client device and that a service flow should be established. The service provider server sends back service flow parameters, e.g., bandwidth, latency etc., parameters to the gateway device which then establishes a service flow with the WiFi capable device in accordance with the received parameters.

The WiFi capable device then sends a request for service to the service server which then responds by delivering the service. Delivering the service may include receiving sensor or video information from the WiFi capable device and triggering the device or a related device such as a home alarm system to generate an alert signal when a particular condition is detected, e.g., fire, smoke, intruder break in, etc.

In at least one embodiment a gateway device with Internet connectivity provided via a cable network is deployed in at a customer premise location. The customer is then provided with one or more WiFi capable devices. Upon power up the WiFi capable device automatically sends a signal to gateway device using the SSID preprogrammed into the WiFi capable device corresponding to the SSID of the configuration network to be used to obtain configuration information. In some embodiments, the as part of the communication with the gateway device, the WiFi capable device sends a DHCP request. The gateway device, in at least one embodiment, operates as a DHCP server and provides the WiFi capable device sufficient information, e.g., an IP address assigned to the device, to allow it to operate as an IP capable device.

An exemplary method of providing a service, in accordance with some embodiments, includes: receiving, at a wireless home gateway device, preconfigured to serve as an access point for a first wireless network used to supply device configuration information, a first wireless signal including a first wireless network identifier corresponding to said first wireless network from said first device; and operating said wireless home gateway device to provide, via said first wireless network, device configuration information to said first device.

While various exemplary embodiments and features have been described, numerous additional features and embodiments are described in the detailed description which follows.

DETAILED DESCRIPTION

Figure 1:
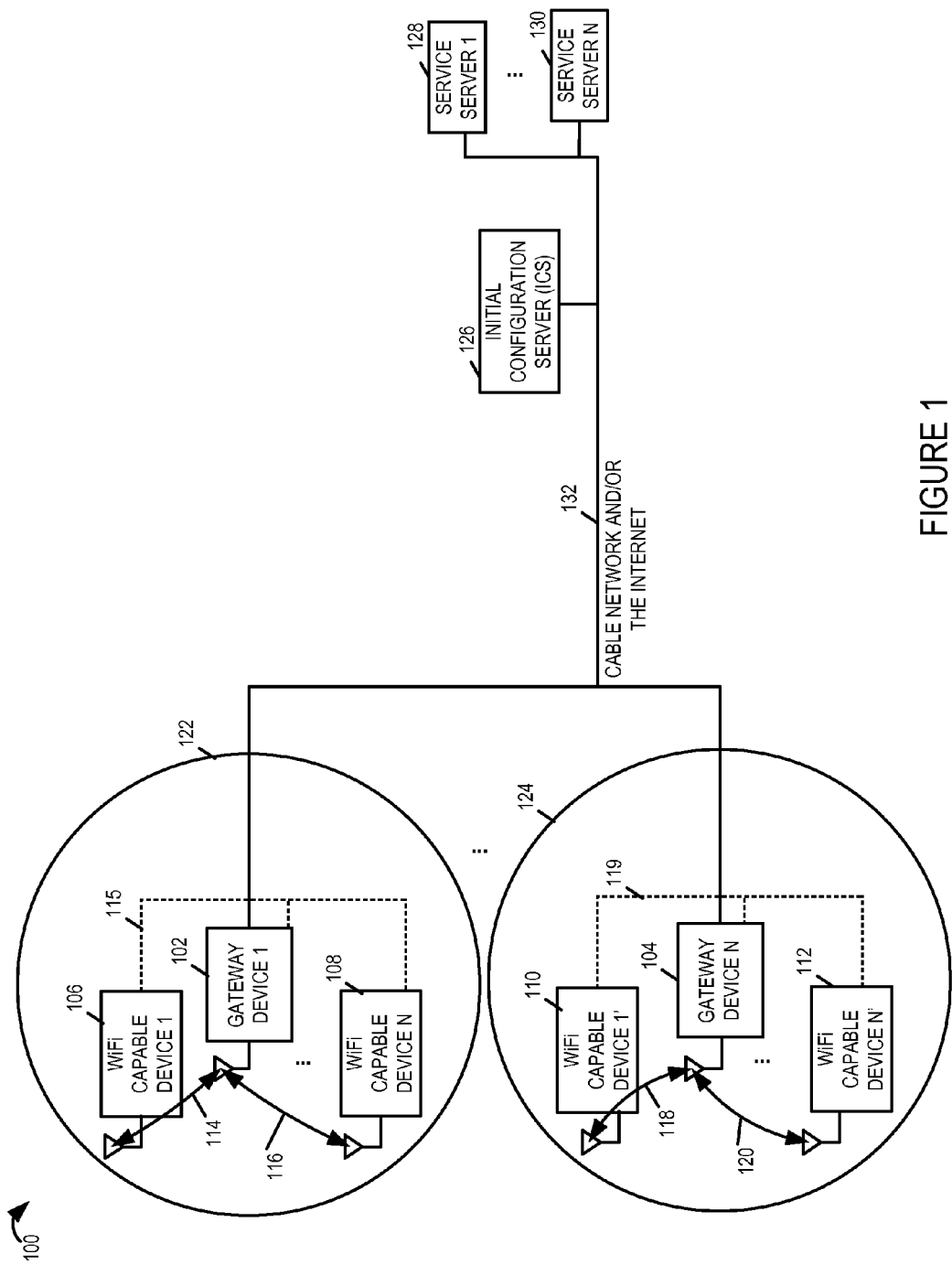
FIG. 1 is a drawing of an exemplary communications system in accordance with an exemplary embodiment.

FIG. 1 is a drawing of an exemplary communications system in accordance with various exemplary embodiments. Exemplary communications system 100 includes a plurality of gateway devices (gateway device 1 102, . . . , gateway device N 104), a initial configuration server (ICS) 126, and a plurality of service servers (service server 1 128, . . . , service server N 130) coupled together via a cable network and/or the Internet 132. The gateway devices (102, . . . , 104) are, e.g., wireless home gateway devices supporting WiFi communications, e.g., one or more versions of the 802.11 standard, and, in some embodiments, one or more local wireless communications networks, e.g., via power line communications, Ethernet, coax cable, etc.

Circle 122 represents a region for home or office local communications networks corresponding to gateway device 1 102. Circle 124 represents a region for home or office local communications networks corresponding to gateway device N 104. Corresponding to gateway device 1 102 there are a plurality of WiFi capable devices (WiFi capable device 1 106, . . . , WiFi capable device N 108) for which gateway device 1 102 serves as a point of network attachment. Corresponding to gateway device N 104 there are a plurality of WiFi capable devices (WiFi capable device 1' 110, . . . , WiFi capable device N' 112) for which gateway device N 104 serves as a point of network attachment.

A WiFi capable device, e.g., WiFi capable device 1 106, is, e.g., one of a camera, audio recorder, healthcare monitoring device, temperature sensor, heat sensor, smoke sensor, CO sensor, home alarm controller, door closed sensor, window closed sensor, motion detector, or alarm. A WiFi capable device, e.g., device 106, includes WiFi capability. A WiFi capable device, e.g., device 106, may, and in some embodiments, does include a capability to communicate via a wired local area network, e.g., via Ethernet, coax or power line communications.

A gateway device, e.g., gateway device 1 102, uses a WiFi communications network, e.g., a first WiFi communications network, for configuring the WiFi capable devices (106, 108). The gateway device 1 102 uses a different WiFi communications network and/or a wired communications network for communicating traffic signaling to the WiFi devices (106, 108), e.g., traffic signaling between a WiFi capable device, e.g., device 1 106, and a service server, e.g., service server 1 128.

Dashed line 115 represents an optional wired communications network coupling devices (106, 108) to gateway device 1 102. Dashed line 119 represents an optional wired communications network coupling devices (110, 112) to gateway device N 104.

In various embodiments, different adjacent gateway devices are configured to use different WiFi configuration network identifiers, e.g., different SSIDs. In some such embodiments, the WiFi capable devices ((106, . . . 108) . . . (110, . . . , 112)) are pre-configured, e.g., at the factory, with a list of possible alternative configuration network identifiers.

Arrow 114 illustrates exemplary wireless signaling between gateway device 1 102 and WiFi capable device 1 106. Arrow 116 illustrates exemplary wireless signaling between gateway device 1 102 and WiFi capable device N 108. Arrow 118 illustrates exemplary wireless signaling between gateway device N 104 and WiFi capable device 1' 110. Arrow 120 illustrates exemplary wireless signaling between gateway device N 104 and WiFi capable device N' 112.

Figure 2:
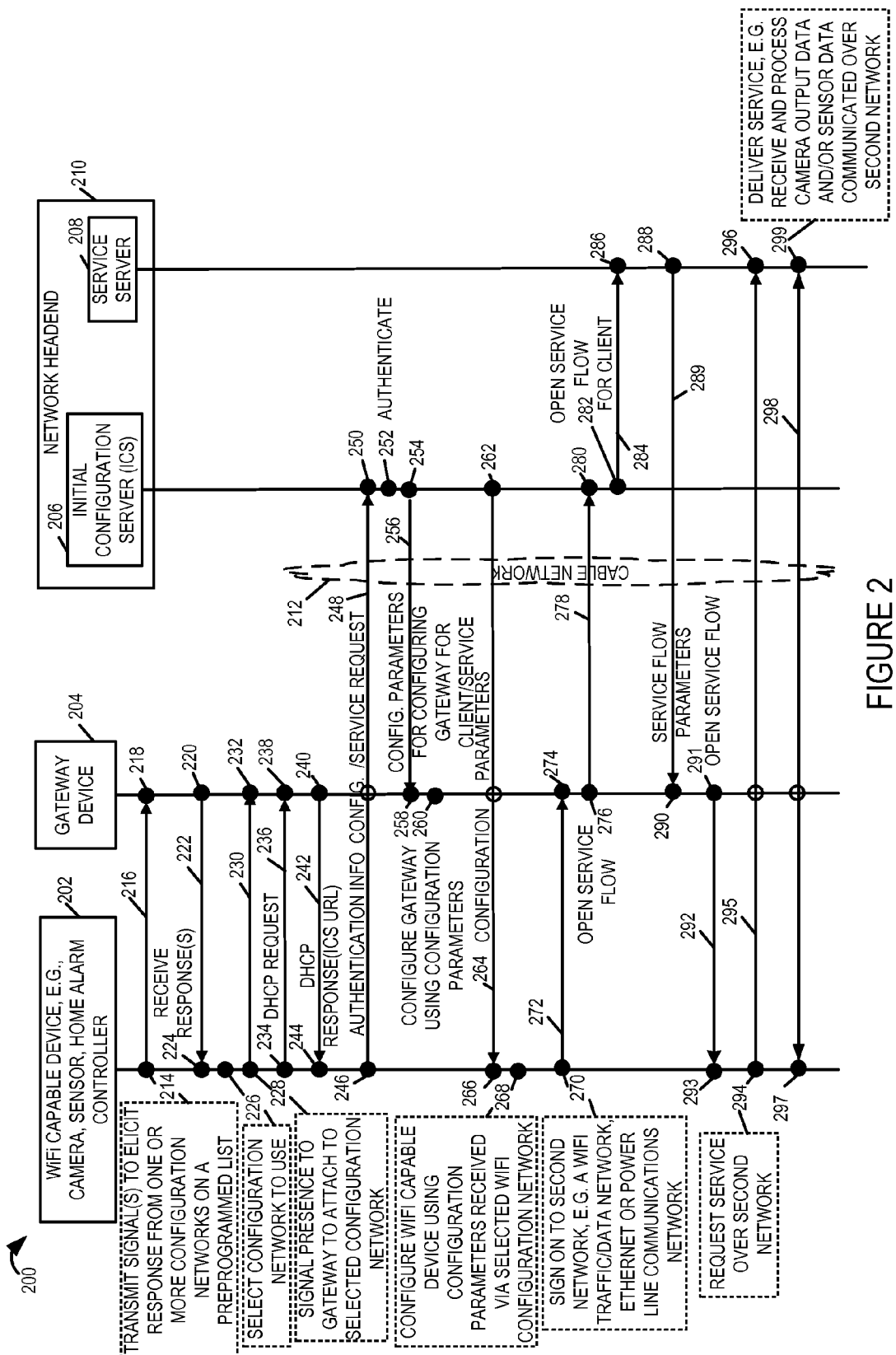
FIG. 2 illustrates an exemplary communications system, exemplary operations and exemplary signaling in accordance with an exemplary embodiment.

FIG. 2 illustrates an exemplary communications system 200, exemplary operations and exemplary signaling in accordance with an exemplary embodiment. System 200 includes a WiFi capable device 202, e.g., a camera, sensor, a healthcare monitoring device, home alarm or other device intended for use with a home network including a gateway device, a gateway device 204, a initial configuration server (ICS) 206, and a service server 208. The ICS 206 and the service server 208 are part of a network headend 210. Gateway device 204 is coupled to the network headend 210 via cable network 212.

In step 214 the WiFi capable device 202 transmits a signal or signals 216 to elicit response from one or more configuration networks on a preprogrammed list. In step 218, gateway device 204 receives signal 216. In step 220, gateway device 204 generates and transmits a response signal to WiFi capable device 202, in response to received signal 222.

In step 224 WiFi capable device 202 receives response signal(s) 222 which includes the response signal from gateway device 204, and may include response signals from other gateways, e.g., a gateway corresponding to a neighbor. In step 226 WiFi capable device 202 selects the configuration network to use based on received signal(s) 222. For example, in step 226 WiFi capable device 202 selects to use the configuration network corresponding to gateway device 204. In various embodiments, the determination is based on power measurements of response signals, e.g., the network corresponding to the response signal having the highest received power is selected. In step 228, WiFi capable device 202 generates and transmits signals 230 to signal its presence to gateway device 204 and attach to the selected configuration network, e.g., the configuration network corresponding to gateway device 204. In some embodiments signals 230 includes sign-on signals, e.g., a sign-on to the selected WiFi configuration network, which corresponds to gateway device 204 and which is one of the configuration networks on the stored pre-programmed list. In step 232 gateway device 204 receives and processes signals 230, e.g., accepting WiFi capable device 202 onto its configuration network.

In step 234 WiFi capable device 202 generates and transmits a DHCP request signal 236. In step 238 gateway device 204 receives the DHCP request signal 236. In step 240, the gateway device 204 generates and transmits DHCP response signal 242, e.g., communicating address information for ICS 206, e.g., a URL for ICS 206. In step 244 the WiFi capable device 202 receives DHCP response signal 242 and recovers the address information for ICS 206.

In step 246 the WiFi capable device 202 generates and transmits signal 248 communicating authentication information and a request for configuration information and/or a service request. In step 250, the initial configuration server 206 receives signal 248. In step 252 the ICS 206 performs an authentication. Consider that the authentication of step 252 is successful.

In step 254 the ICS 206 generates and transmits signal 256 communicating gateway configuration parameters to gateway device 204 in response to the service request of signal 248. The gateway configuration parameters communicated in signal 256 are for configuring the gateway device 204 for client/service communications, where the client is the WiFi capable device 202. In various embodiments, the gateway configuration information includes a service identifier and addressing information to be used by the gateway device 204 for sending information received from the Wi-Fi capable device 202 relating to a service to service provider server 208 which provides a function with regard to the service. In some embodiments, the gateway configuration information includes information to account for a new client, e.g., WiFi capable device 202, of a particular managed service, e.g., information to modify a firewall, information to increase bandwidth, information to open a new SSID, information to change channels of a particular SSID, information to enable MoCA.

In step 258 the gateway device 204 receives signal 256 and recovers the configuration parameters. In step 260 the gateway device 204 configures the gateway using the recovered parameters for client/service communications.

In step 262 the ICS 206 generates and transmits a signal communicating configuration parameters 264 to WiFi capable device 202 in response to the service request of signal 248. The configuration parameters 264 from WiFi capable device 202 are communicated via gateway device 204 using the selected configuration network, which is the WiFi configuration network of gateway device 204. In step 266 the WiFi capable device 202 receives and recovers the communicated configuration parameters 264. In some embodiments, the configuration parameters 264 include information identifying a second network to use for traffic signaling, e.g., an SSID corresponding to a WiFi network of gateway device 204 to be used for traffic signaling, or information identifying a wired network of gateway device 204 to be used for traffic signaling, e.g., an Ethernet, coax cable, or power line communications network. In some embodiments, the configuration parameters 264 include bandwidth constraint information for a traffic channel. In step 268 the WiFi capable device 202 configures itself using the received configuration parameters 264, which were communicated via the selected WiFi configuration network of gateway device 204.

In step 270 the WiFi capable device 202 signs on to the second network, e.g., a WiFi traffic/data network, Ethernet coax network, or power line communications network. In step 274 sign on signal 272 is received by gateway device 204. In step 276 gateway device 276 generates and transmits signal 278 to ICS 206 to open a service flow. In step 280 ICS 206 receives signal 278, and in step 282 ICS 206 generates and transmits signal 284 to service server 208 to open the service flow for the client. In step 286 the service server 208 receives signal 284, and in response, in step 288, the service server generates and transmits signal 289 to gateway device 204 communicating service flow parameters. Service flow parameters include, e.g., bandwidth information and latency information. In step 290 the gateway device 204 receives signal 289 and recovers the communicated service flow parameters. In step 291, gateway device 204 generates and transmits signal 292 to WiFi capable device 202 to open a service flow. In step 293 the WiFi capable device 202 receives signal 292 and processes the communicated information.

In step 294 WiFi capable device 202 generates and transmits a request for service 295 to service server 208. The request 295 is communicated over the second communications network to the gateway device 204, which forwards the request to the service server 208. In step 296 the service server 208 receives service request 295 and processes the request. In step 299, service server 208 delivers the requested service, e.g., receiving and processing camera output data and/or sensor data 298, which was transmitted to service server 208 by WiFi capable device 202 in step 297 over the second network via gateway device 204.

Figure 3A:
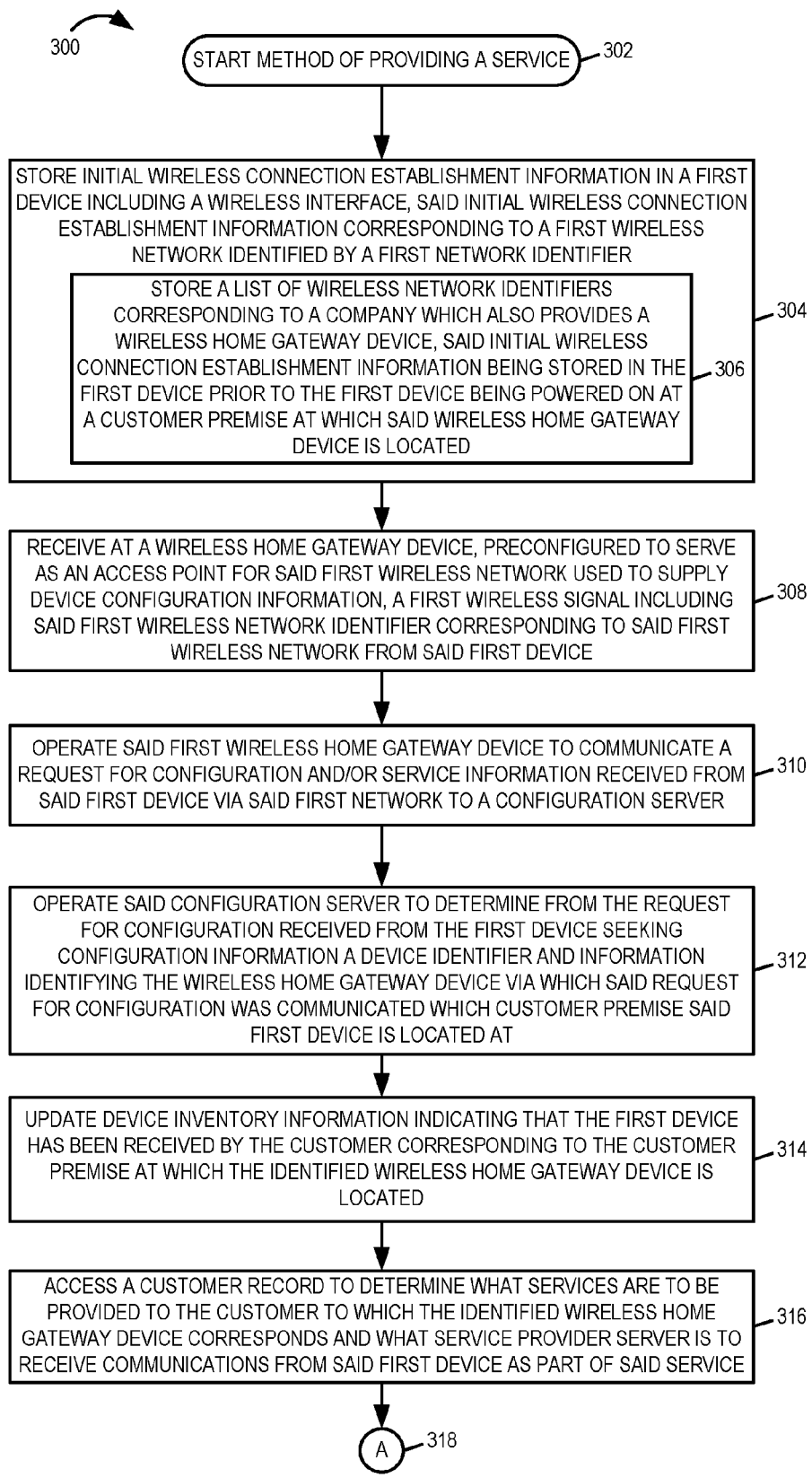
FIG. 3A is a first part of a flowchart of an exemplary method of providing a service in accordance with an exemplary embodiment.
Figure 3B:
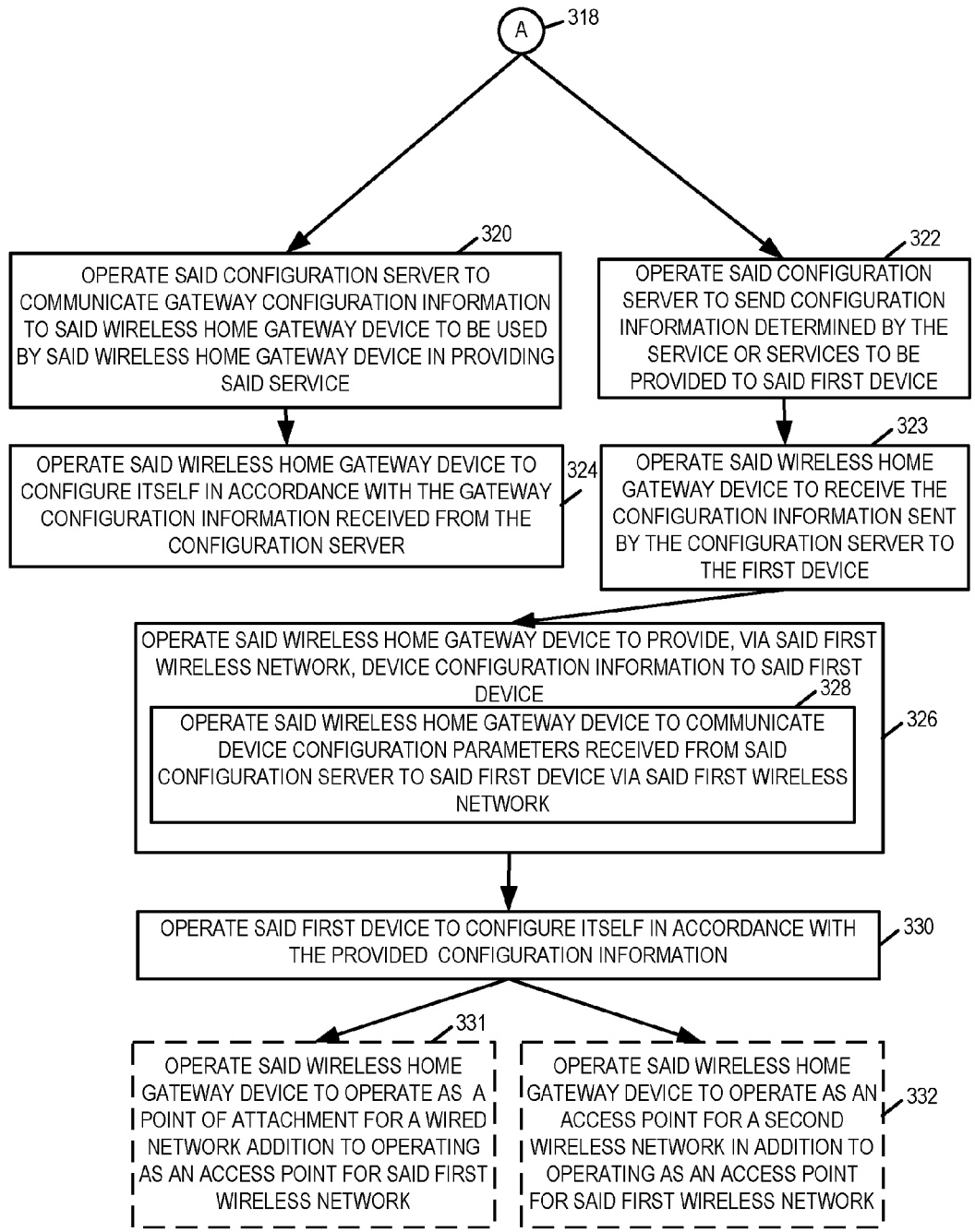
FIG. 3B is a second part of a flowchart of an exemplary method of providing a service in accordance with an exemplary embodiment.

FIG. 3, comprising the combination of FIG. 3A and FIG. 3B, is a flowchart 300 of an exemplary method of providing a service in accordance with an exemplary embodiment. The exemplary method of flowchart 300 is, e.g., performed by devices of system 100 of FIG. 1 or by devices of FIG. 2.

Operation of the method starts in start step 302 and proceeds to step 304. In step 304 initial wireless connection establishment information is stored in a first device including a wireless interface, said initial wireless connection establishment information corresponds to a first wireless network identified by a first network identifier. In some embodiments, the storing of step 304 is performed at the factory or at a supplier site prior to shipment to the customer premise site. In some embodiments, the first device is a WiFi capable device. In some embodiments, the first device is a home monitoring device. In some such embodiments, the first device is a wireless camera, temperature sensor, window position sensor, or door position sensor. In some embodiments, the first device is a medical information monitoring device. Step 304 includes step 306 in which a list of wireless connection identifiers are stored corresponding to a company which also provides a wireless home gateway device, said initial wireless connection establishment information being stored in the first device prior to the first device being powered on at a customer premise at which said wireless home gateway device is located. Operation proceeds from step 304 to step 308.

In step 308 the wireless home gateway device, which is preconfigured to serve as an access point for said first wireless network used to supply device configuration information, receives a first wireless signal including said first wireless network identifier corresponding to said first wireless network from said first device. In various embodiments, the wireless home gateway device is preprogrammed prior to being powered on at said customer premise to act as an access point for one of said networks identified on said list of wireless network identifiers. In some such embodiments, the wireless home gateway device acts as an access point for a different configuration network than a configuration network supported by another wireless home gateway device located at a customer premise adjacent the customer premise in which said wireless home gateway device is located.

In some embodiments, the first device is a WiFi capable device and the first network identifier is an SSID (Service Set Identifier) identifying a wireless network used to supply device configuration information. In some embodiments, the device configuration information includes information used to configure the first device for a service which is provided via a different communications network than the first wireless communications network, which is used to supply device configuration information. In various embodiments, the device configuration information includes information identifying an application server, e.g., an IP address, to which said first device being configured is to transmit information detected by the first device via the second network.

In some embodiments, the device configuration information identifies a home network to be used for data traffic corresponding to the service for which the device is being configured. In some embodiments, the home network is a wired network, and the wired network is one of an Ethernet network or a power line network. In some embodiments, the home network is a second wireless network. In some embodiments, the first and second wireless networks are WiFi networks, and the first wireless network is identified by a first SSID and the second wireless network is identified by a second SSID, and the first and second SSIDs are different. In some embodiments, the wireless home gateway device operates as a policy enforcement point with regard to the first wireless network limiting use of said first wireless network to configuration related traffic. In some embodiments, the wireless home gateway device limits the amount of bandwidth the first device can use on the first wireless network to a fraction of the amount of bandwidth the first device can use on the second wireless network.

Operation proceeds from step 308 to step 310. In step 310, the first wireless home gateway is operated to communicate a request for configuration and/or service information received from said first device via said first network to a configuration server. Operation proceeds from step 310 to step 312.

In step 312 the configuration server is operated to determined from the request for configuration received from the first device seeking configuration information a device identifier, e.g., a device MAC address, and information identifying the wireless home gateway device, e.g., a gateway identifier included in the routed configuration request such as a MAC address or IP address being used by the gateway, via which said request for configuration was communicated which customer premise said first device is located at. Operation proceeds from step 312 to step 314. In step 314 the configuration server updates device inventory information indicating that the first device has been received by the customer premise at which the identified wireless home gateway device is located. Operation proceeds from step 314 to step 316.

In step 316 the configuration server accesses a customer record to determine what services are to be provided to the customer to which the identified wireless home gateway device corresponds and what service provider server is to receive communications from said first device as part of said service, e.g., what type of monitoring and/or alarms are to be generated, e.g., how often temperature, etc., is to be checked and recorded and/or what temperature is to trigger an alarm. Operation proceeds from step 316 via connecting node A 318 to step 320 and 322.

In step 320 the configuration server is operated to communicate gateway configuration information to said wireless home gateway device to be used by said wireless home gateway device in providing said service. Operation proceeds from step 320 to step 324, In step 324 the wireless home gateway device is operated to configure itself in accordance with the gateway configuration information received from the configuration server. In various embodiments, the gateway configuration information includes a service identifier and addressing information to be used by the gateway for sending information received from the first wireless device relating to said service to a service provider server which provides a function with regard to the service. In some embodiments, the service server provides a monitoring service, e.g., monitors sensor and or camera output and generates alarms, notifies police, private security guard, fire department, first aid squad, home owner, business owner, monitors medial information, e.g., blood pressure, heart rate, heart information, sugar levels, blood measurement information, temperature, etc. In some embodiments, the gateway configuration information includes information to account for a new client of a particular managed service, e.g., information to modify a firewall, information to increase bandwidth information, information to open a new SSID, information to change channels of a particular SSID, information to enable MoCA, etc.

Returning to step 322, in step 322 the configuration server is operated to send configuration information determined by the service or services to be provided to said first device. Operation proceeds from step 322 to step 323 in which the wireless home gateway device receives the configuration information sent to the first device. Operation proceeds from step 323 to step 326.

In step 326 the wireless home gateway device is operated to provide, via said first wireless network, device configuration information to said first device. Step 326 includes step 328 in which the wireless home gateway device is operated to communicate said device configuration parameters, e.g., a network identifier to use, a SSID of traffic of gateway supported home network to use for traffic data, bandwidth constraint information for a traffic channel, information on time to transmit data, etc., received from said configuration server to said first device via said first wireless network. Operation proceeds from step 326 to step 330.

In step 330 the first device is operated to configure itself in accordance with the provided configuration information. Operation proceeds from step 330 to step 331 or step 332, e.g. In step 331 the wireless home gateway device operates as a point of attachment for a wired network in addition to operating as an access point for said first wireless network. In step 331 the wireless home gateway device receives and/or sends traffic data signals via the wired network. For example, the gateway receives camera and/or sensor related information, e.g., camera feed and/or sensor measurements communicated from the first device over the wired network. In step 332 the wireless home gateway device operates as an access point for a second wireless network in addition to operating as an access point for said first wireless network. For example, the gateway receives camera and/or sensor related information, e.g., camera feed and/or sensor measurements communicated from the first device over the second wireless network.

In various embodiments, the steps method of flowchart 300 are repeated for another client device in addition to the first device, e.g., a second Wi-Fi capable device which is deployed in the coverage area of the gateway device.

Figure 4:
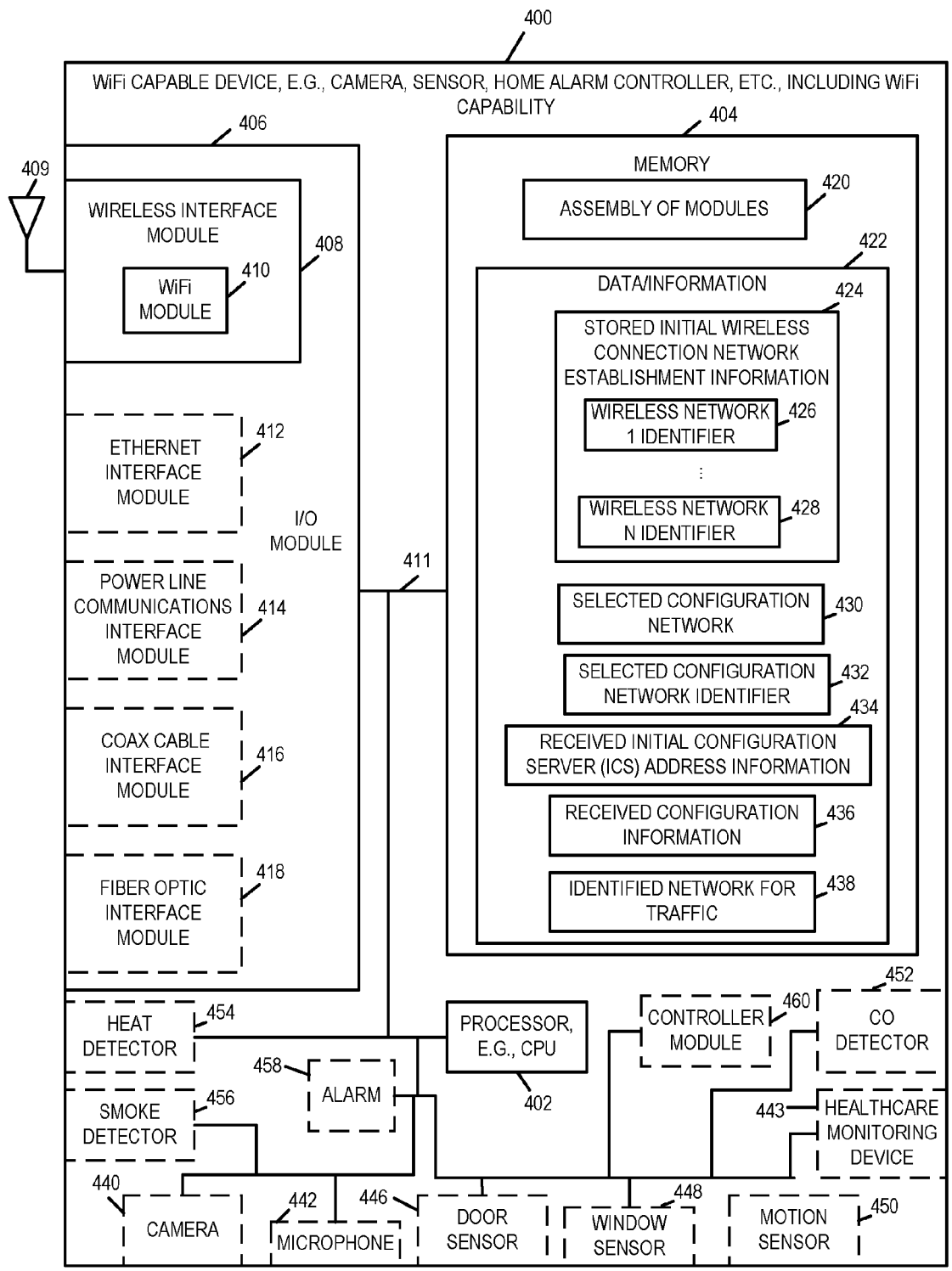
FIG. 4 is a drawing of an exemplary WiFi capable device in accordance with various exemplary embodiments.

FIG. 4 is a drawing of an exemplary WiFi capable device 400 in accordance with various exemplary embodiments. WiFi capable device 400 is, e.g., one of a camera, sensor, alarm, or home alarm controller including WiFi capability. WiFi capable device 400 is, e.g., one of the WiFi capable devices (106, 108, 110, 112) of FIG. 1 or WiFi capable device 202 of FIG. 2 or the first device of flowchart 300 of FIG. 3.

WiFi capable device 400 includes a processor 402, e.g., a CPU, a memory 404, and an input/output (I/O) module 406 coupled together via a bus 411 over which the various elements many interchange data and information. I/O module 406 includes a wireless interface module 408 which is coupled to an antenna 409 via which the wireless I/O module 408 receives and transmits wireless signals. Wireless I/O module 408 includes a WiFi module 410 supporting WiFi communications. In some embodiments I/O module 406 further includes one or more or all of an Ethernet interface module 412, a power line communications interface module 414, a coax cable interface module 416 and a fiber optic interface module 418.

Memory 404 includes an assembly of modules 420 and data/information 422. Data/information 422 includes stored initial wireless connection network establishment information 424, a selected configuration network 430, a selected configuration network identifier 432, received initial configuration server (ICS) address information 434, received configuration information 436, and an identified network for traffic 438. Stored initial wireless connection network establishment information 424 includes a plurality of wireless network identifiers (wireless network 1 identifier 426, . . . , wireless network N identifier 428).

In various embodiments, WiFi capable device 400 includes one or more or all of: a camera 440, a microphone 442, a healthcare monitoring device 443, a door sensor 446, a window sensor 448, a motion sensor 450, a CO detector 452, a heat detector 454, a smoke detector 456, an alarm 458, and a controller module 460, coupled to bus 411.

Processor 402, e.g., a CPU, executes routines and uses data/information in memory 404 to controls operation of WiFi capable device 400 and implement the steps of a method, e.g., steps of a method described with respect to WiFi capable device 202 of FIG. 2 and/or steps of the method of flowchart 300 of FIG. 3 with respect to the first device.

Figure 5:
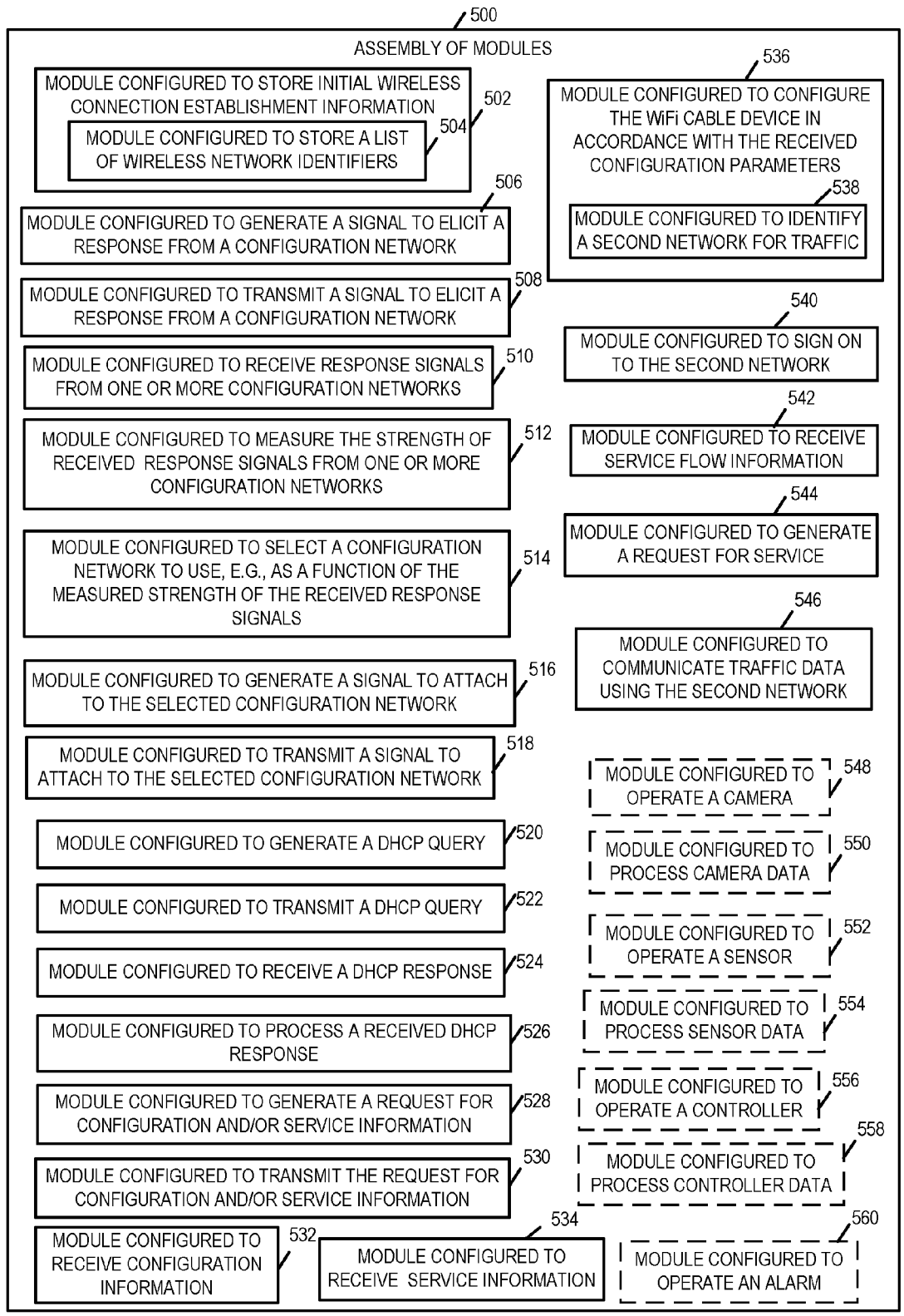
FIG. 5 is a drawing of an assembly of modules that may be used in the WiFi capable device of FIG. 4.

FIG. 5 illustrates an assembly of modules 500 which can, and in some embodiments is, used in the WiFi capable device 400 illustrated in FIG. 4. In some embodiments the assembly of modules 500 can be implemented in hardware within the processor 402 of the WiFi capable device 400, e.g., as individual circuits. The modules in the assembly 500 can, and in some embodiments are, implemented fully in hardware within the processor 402, e.g., as individual circuits. In other embodiments some of the modules are implemented, e.g., as circuits, within the processor 402 with other modules being implemented, e.g., as circuits, external to and coupled to the processor. As should be appreciated the level of integration of modules on the processor and/or with some modules being external to the processor may be one of design choice.

Alternatively, rather than being implemented as circuits, all or some of the modules may be implemented in software and stored in the memory 404 of the WiFi capable device 400, with the modules controlling operation of WiFi capable device 400 to implement the functions corresponding to the modules when the modules are executed by a processor, e.g., processor 426. In some such embodiments, the assembly of modules 500 is included in the memory 404 as assembly of modules 420. In still other embodiments, various modules are implemented as a combination of hardware and software, e.g., with another circuit external to the processor providing input to the processor 402 which then under software control operates to perform a portion of a module's function. While shown in the FIG. 4 embodiment as a single processor, e.g., computer, it should be appreciated that the processor 402 may be implemented as one or more processors, e.g., computers.

When implemented in software the modules include code, which when executed by the processor 402, configure the processor 402 to implement the function corresponding to the module. In embodiments where the assembly of modules 500 is stored in the memory 404, the memory 404 is a computer program product comprising a computer readable medium comprising code, e.g., individual code for each module, for causing at least one computer, e.g., processor 402, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 5 control and/or configure the WiFi capable device 400 or elements therein such as the processor 402, to perform steps of a method described in FIG. 2 with regard to WiFi capable device 202 and/or functions of the steps illustrated in the method flowchart 300 of FIG. 3 with regard to the first device. Thus the assembly of modules 500 includes various modules that perform functions of corresponding steps of the method shown in FIG. 3 and/or as described with regard to FIG. 2.

Assembly of modules 500 includes a module 502 configured to store initial wireless connection establishment information, a module 506 configured to generate a signal to elicit a response for a configuration network, a module 508 configured to transmit a signal to elicit a response from a configuration network, a module 510 configured to receive response signals from one or more configuration networks, a module 512 configured to measure the strength of received response signals from one or more configuration networks, and a module 514 configured to select a configuration network to use, e.g., as the function of the measured strength of the received response signals. Module 502 includes a module 504 configured to store a list of wireless network identifiers.

Assembly of modules 500 further includes a module 516 configured to generate a signal to attach to the selected configuration network, a module 518 configured to transmit a signal to attach to the selected configuration network, a module 520 configured to generate a DHCP query, a module 522 configured to transmit a DHCP query, a module 524 configured to receive a DHCP response, a module 526 configured to process a received DHCP response, a module 528 configured to generate a request for configuration and/or service information, a module 530 configured to transmit the request for configuration and/or service information, a module 532 configured to received configuration information a module 534 configured to receive service information, and a module 536 configured to configure the WiFi cable device in accordance with the received configuration parameters. Module 536 includes a module 538 configured to identify a second network for traffic.

Assembly of modules 500 further includes a module 540 configured to sign on to the second network, a module 542 configured to receive service flow information, a module 544 configured to generate a request for service , and a module 546 configured to communicate traffic data using the second network.

In various embodiments, assembly of modules 500 includes one or more or all of: a module 548 configured to operate a camera, a module 550 configured to process camera data, a module 552 configured to operate a sensor, a module 554 configured to process sensor data, a module 556 configured to operate a controller, a module 558 configured to process controller data, and a module 560 configured to operate an alarm.

Figure 6:
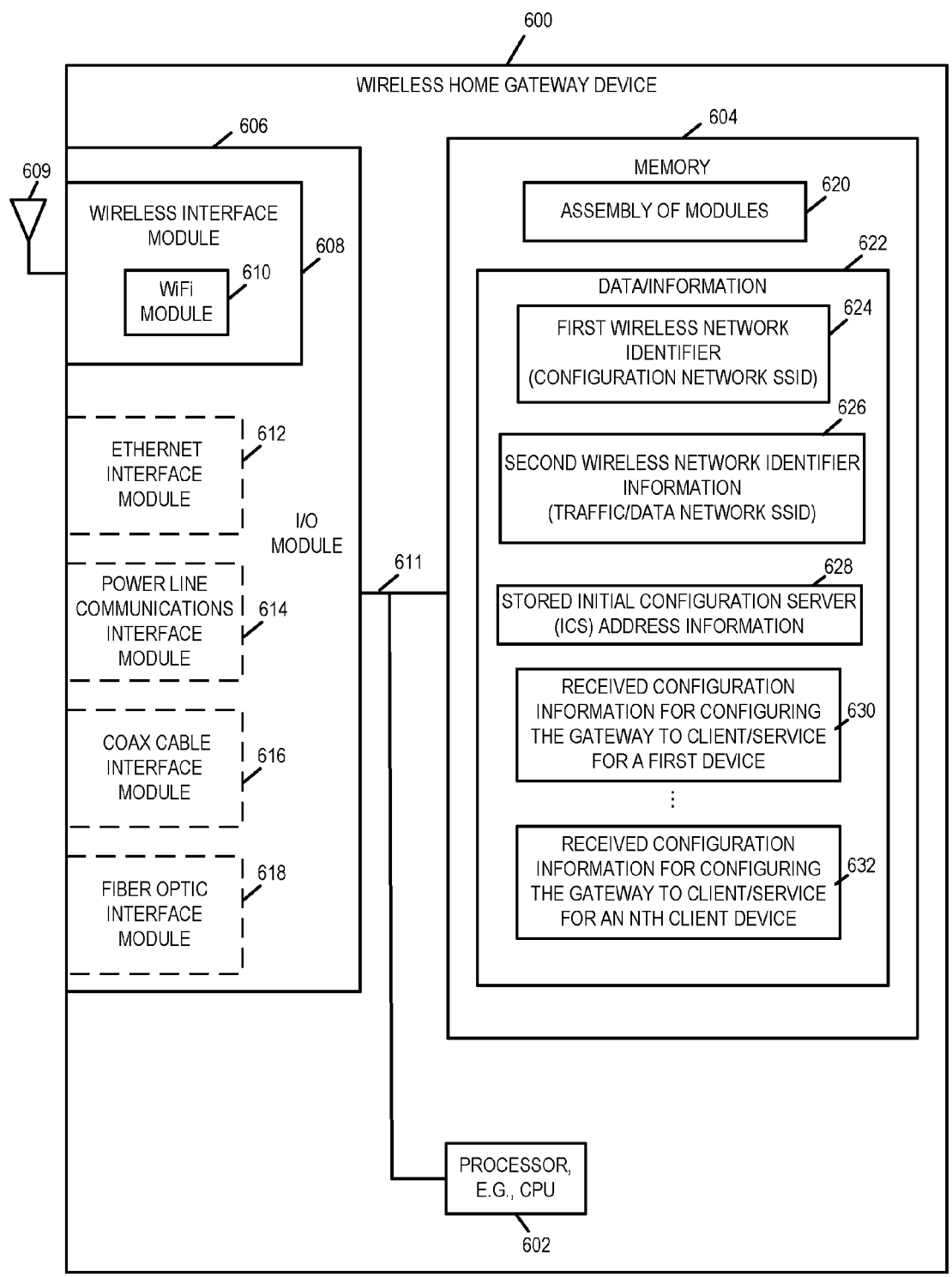
FIG. 6 is a drawing of an exemplary wireless home gateway device in accordance with various exemplary embodiments.

FIG. 6 is a drawing of an exemplary wireless home gateway device 600 in accordance with various exemplary embodiments. Wireless home gateway device 600 is, e.g., one of the gateway devices (102, . . . , 104) of FIG. 1, gateway device 204 of FIG. 2 of the wireless home gateway device of flowchart 300 of FIG. 3.

Wireless home gateway device 600 includes a processor 602, e.g., a CPU, a memory 604, and an input/output (I/O) module 606 coupled together via a bus 611 over which the various elements many interchange data and information. I/O module 606 includes a wireless interface module 608 which is coupled to an antenna 609 via which the wireless I/O module 608 receives and transmits wireless signals. Wireless I/O module 608 includes a WiFi module 610 supporting WiFi communications. In some embodiments I/O module 606 further includes one or more or all of an Ethernet interface module 612, a power line communications interface module 614, a coax cable interface module 616 and a fiber optic interface module 618.

Memory 604 includes an assembly of modules 620 and data/information 622. Data/information 622 includes a first wireless network identifier 624, e.g., a configuration network SSID, a second wireless network identifier 626, e.g., a traffic/data network SSID, stored initial configuration server (ICS) address information 628, and received configuration information for configuring the gateway corresponding to one or more devices (received configuration information for configuring the gateway for client/service communications for a first client device 630, . . . , received configuration information for configuring the gateway for client/service communications for an nth client device 632.

Processor 602, e.g., a CPU, executes routines and uses data/information in memory 604 to controls operation of wireless home gateway device 4600 and implement the steps of a method, e.g., steps of a method described with respect to gateway device 204 of FIG. 2 and/or steps of the method of flowchart 300 of FIG. 3 with respect to the wireless home gateway device.

Figure 7:
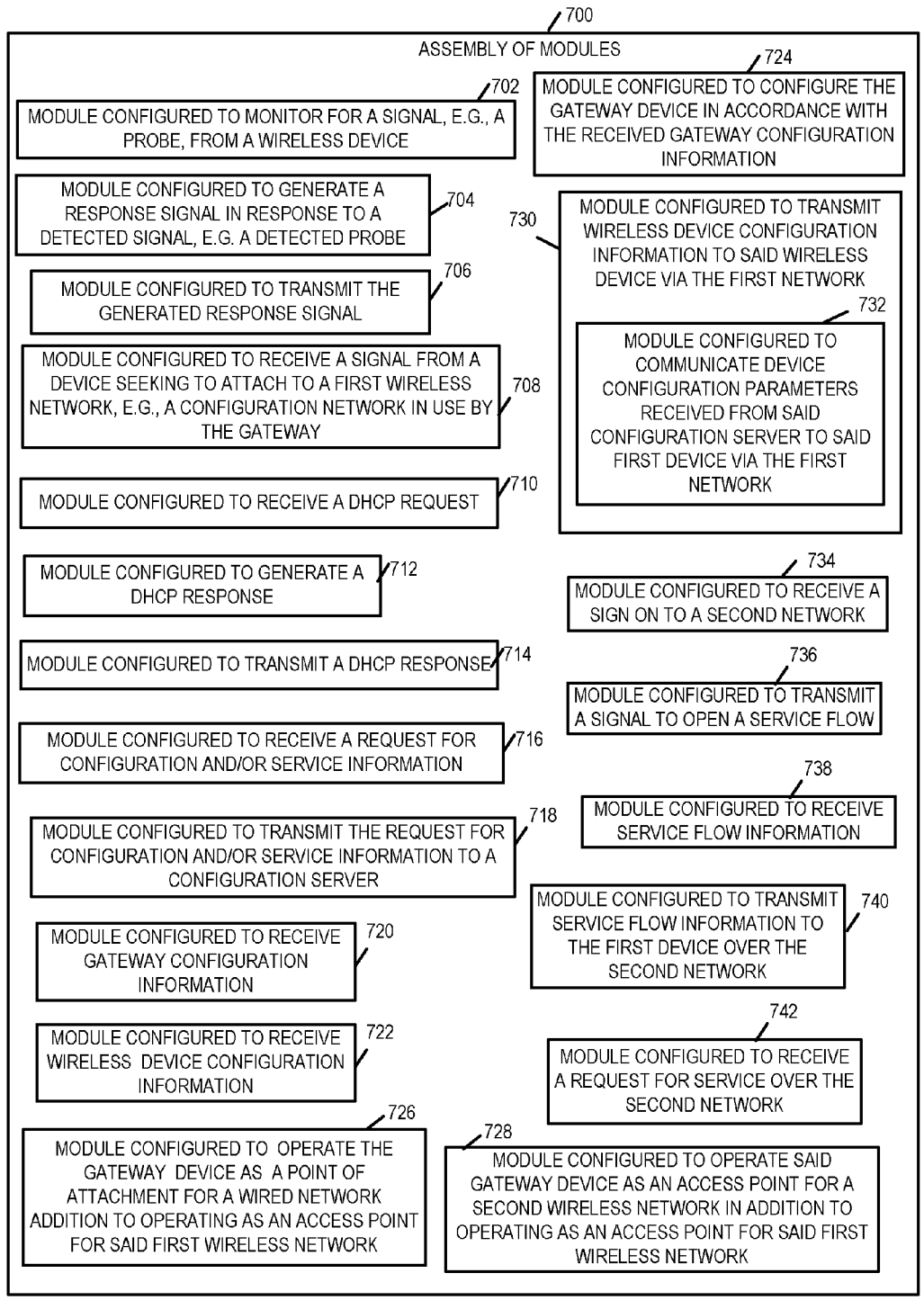
FIG. 7 is a drawing of an assembly of modules that may be used in the wireless home gateway device of FIG. 6.

FIG. 7 illustrates an assembly of modules 700 which can, and in some embodiments is, used in the wireless home gateway device 600 illustrated in FIG. 6. In some embodiments the assembly of modules 700 can be implemented in hardware within the processor 602 of the wireless home gateway device 600, e.g., as individual circuits. The modules in the assembly 700 can, and in some embodiments are, implemented fully in hardware within the processor 602, e.g., as individual circuits. In other embodiments some of the modules are implemented, e.g., as circuits, within the processor 602 with other modules being implemented, e.g., as circuits, external to and coupled to the processor. As should be appreciated the level of integration of modules on the processor and/or with some modules being external to the processor may be one of design choice.

Alternatively, rather than being implemented as circuits, all or some of the modules may be implemented in software and stored in the memory 604 of the wireless home gateway device 600, with the modules controlling operation of wireless home gateway device 600 to implement the functions corresponding to the modules when the modules are executed by a processor, e.g., processor 602. In some such embodiments, the assembly of modules 700 is included in the memory 604 as assembly of modules 620. In still other embodiments, various modules are implemented as a combination of hardware and software, e.g., with another circuit external to the processor providing input to the processor 602 which then under software control operates to perform a portion of a module's function. While shown in the FIG. 6 embodiment as a single processor, e.g., computer, it should be appreciated that the processor 602 may be implemented as one or more processors, e.g., computers.

When implemented in software the modules include code, which when executed by the processor 602, configure the processor 602 to implement the function corresponding to the module. In embodiments where the assembly of modules 700 is stored in the memory 604, the memory 604 is a computer program product comprising a computer readable medium comprising code, e.g., individual code for each module, for causing at least one computer, e.g., processor 602, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 7 control and/or configure the wireless home gateway device 600 or elements therein such as the processor 602, to perform steps of a method described in FIG. 2 with regard to gateway device 204 and/or functions of the steps illustrated in the method flowchart 300 of FIG. 3 with regard to the wireless home gateway device. Thus the assembly of modules 700 includes various modules that perform functions of corresponding steps of the method shown in FIG. 3 and/or as described with regard to FIG. 2.

Assembly of modules 700 includes a module 702 configured to monitor for a signal, e.g., a probe, from a wireless device, a module 704 configured to generate a response signal in response to a detected signal, e.g., a detected probe, a module 706 configured to transmit the generated response signal, a module 708 configured to receive a signal from a device seeking to attach to a first wireless network, e.g., a configuration network in use by the gateway, a module 710 configured to receive a DHCP request, a module 712 configured to generate a DHCP response, and a module 714 configured to transmit a DHCP response.

Assembly of modules 700 further includes a module 716 configured to receive a request for configuration and/or service information, a module 718 configured to transmit the request for configuration and/or service information to a configuration server, a module 720 configured to receive gateway configuration information and a module 722 configured to receive wireless device configuration information. Assembly of module 700 further includes a module 724 configured to configure the gateway in accordance with the received gateway configuration information, a module 726 configured to operate the gateway device as a point of attachment for a wired network in addition to operating as an access point for the first wireless network, a module 728 configured to operate said gateway device as an access point for a second wireless network in addition to operating as an access point for said first wireless network, a module 730 configured to transmit wireless device configuration information to said wireless device via the first network. Module 730 includes a module 732 configured to communicate device configuration parameters received from said configuration server to said first device via the first network.

Assembly of modules 700 further includes a module 734 configured to receive a sign on to a second network, a module 736 configured to transmit a signal to open a service flow, a module 738 configured to receive service flow information, a module 740 configured to transmit service flow information to the first device over the second network, a module 742 configured to receive a request for service over the second network.

Figure 8:
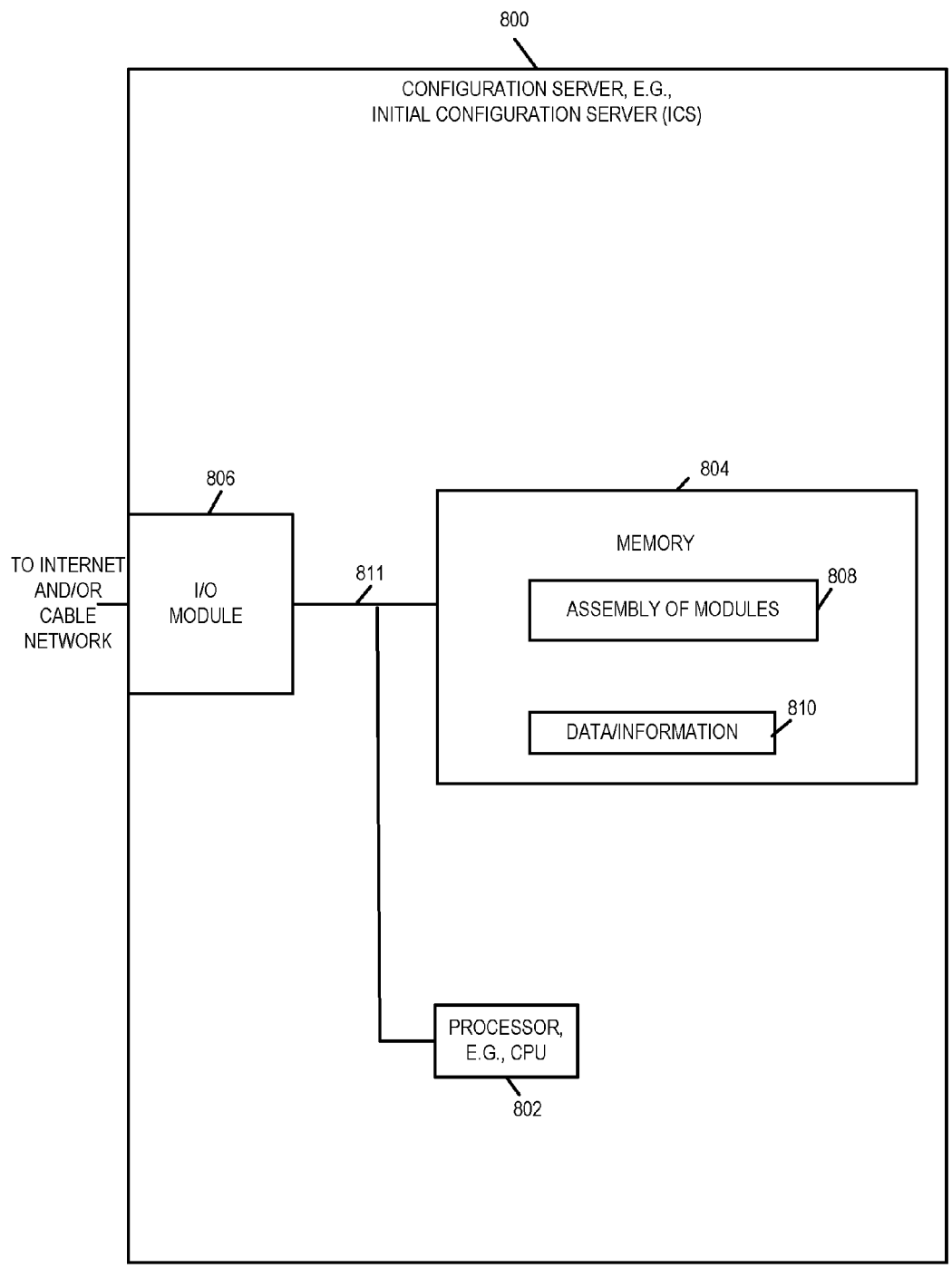
FIG. 8 is a drawing of an exemplary configuration server in accordance with various exemplary embodiments.

FIG. 8 is a drawing of an exemplary configuration server, e.g., an initial configuration server (ICS) in accordance with various exemplary embodiments. Configuration server 800 is, e.g., ICS 126 of system 100 of FIG. 1, ICS 208 of system 200 of FIG. 2, or the configuration server of flowchart 300 of FIG. 3.

Configuration server 800 includes a processor 802, e.g., a CPU, memory 804, and an I/O module 806 coupled together via bus 811 over which the various elements may interchange data and information. I/O module 806 couples the configuration server 800 to a cable network and/or the Internet. Memory 804 includes an assembly of modules 808 and data/information 810.

Figure 9:
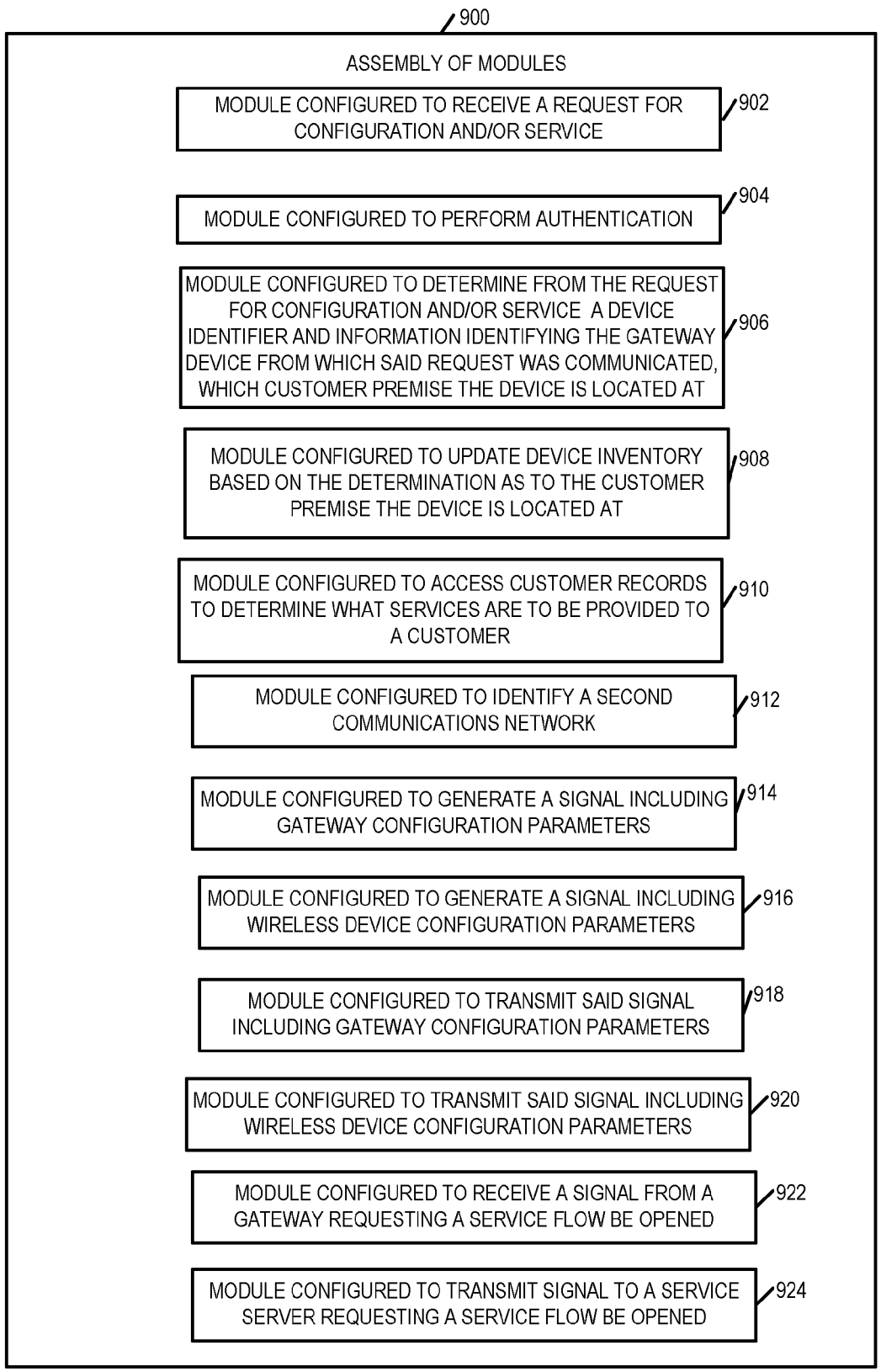
FIG. 9 is a drawing of an assembly of modules that may be used in the configuration server of FIG. 8.

FIG. 9 illustrates an assembly of modules 900 which can, and in some embodiments is, used in the configuration server 800 illustrated in FIG. 8. In some embodiments the assembly of modules 900 can be implemented in hardware within the processor 802 of the configuration server 800, e.g., as individual circuits. The modules in the assembly 900 can, and in some embodiments are, implemented fully in hardware within the processor 802, e.g., as individual circuits. In other embodiments some of the modules are implemented, e.g., as circuits, within the processor 802 with other modules being implemented, e.g., as circuits, external to and coupled to the processor. As should be appreciated the level of integration of modules on the processor and/or with some modules being external to the processor may be one of design choice.

Alternatively, rather than being implemented as circuits, all or some of the modules may be implemented in software and stored in the memory 804 of the configuration server 800, with the modules controlling operation of configuration server 800 to implement the functions corresponding to the modules when the modules are executed by a processor, e.g., processor 802. In some such embodiments, the assembly of modules 900 is included in the memory 804 as assembly of modules 808. In still other embodiments, various modules are implemented as a combination of hardware and software, e.g., with another circuit external to the processor providing input to the processor 802 which then under software control operates to perform a portion of a module's function. While shown in the FIG. 8 embodiment as a single processor, e.g., computer, it should be appreciated that the processor 802 may be implemented as one or more processors, e.g., computers.

When implemented in software the modules include code, which when executed by the processor 802, configure the processor 802 to implement the function corresponding to the module. In embodiments where the assembly of modules 900 is stored in the memory 804, the memory 804 is a computer program product comprising a computer readable medium comprising code, e.g., individual code for each module, for causing at least one computer, e.g., processor 802, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 9 control and/or configure the configuration server 800 or elements therein such as the processor 802, to perform steps of a method described in FIG. 2 with regard to initial configuration server 206 and/or functions of the steps illustrated in the method flowchart 300 of FIG. 3 with regard to the configuration server. Thus the assembly of modules 900 includes various modules that perform functions of corresponding steps of the method shown in FIG. 3 and/or as described with regard to FIG. 2.

Assembly of modules 900 includes a module 902 configured to receive a request for configuration and/or service, a module 904 configured to perform authentication, a module 906 configured to determine from the request for configuration and/or service a device identifier and information identifying the gateway device form which said request was communicated, which customer premise the device is located at, a module 908 configured to update device inventory based on the determination as to the customer premise the device is located at, a module 910 configured to access customer record to determine what services are to be provided a customer, a module 912 configured to identify a second communications network, a module 914 configured to generate a signal including gateway configuration parameters, a module 916 configured to generate a signal including wireless device configuration parameters, a module 918 configured to transmit said signal including gateway configuration parameters, a module 920 configured to transmit said signal including wireless device configuration parameters, a module 922 configured to receive a signal from a gateway requesting a service flow be opened, and a module 924 configured to transmit a signal to a service server requesting that a service flow be opened.

Figure 10:
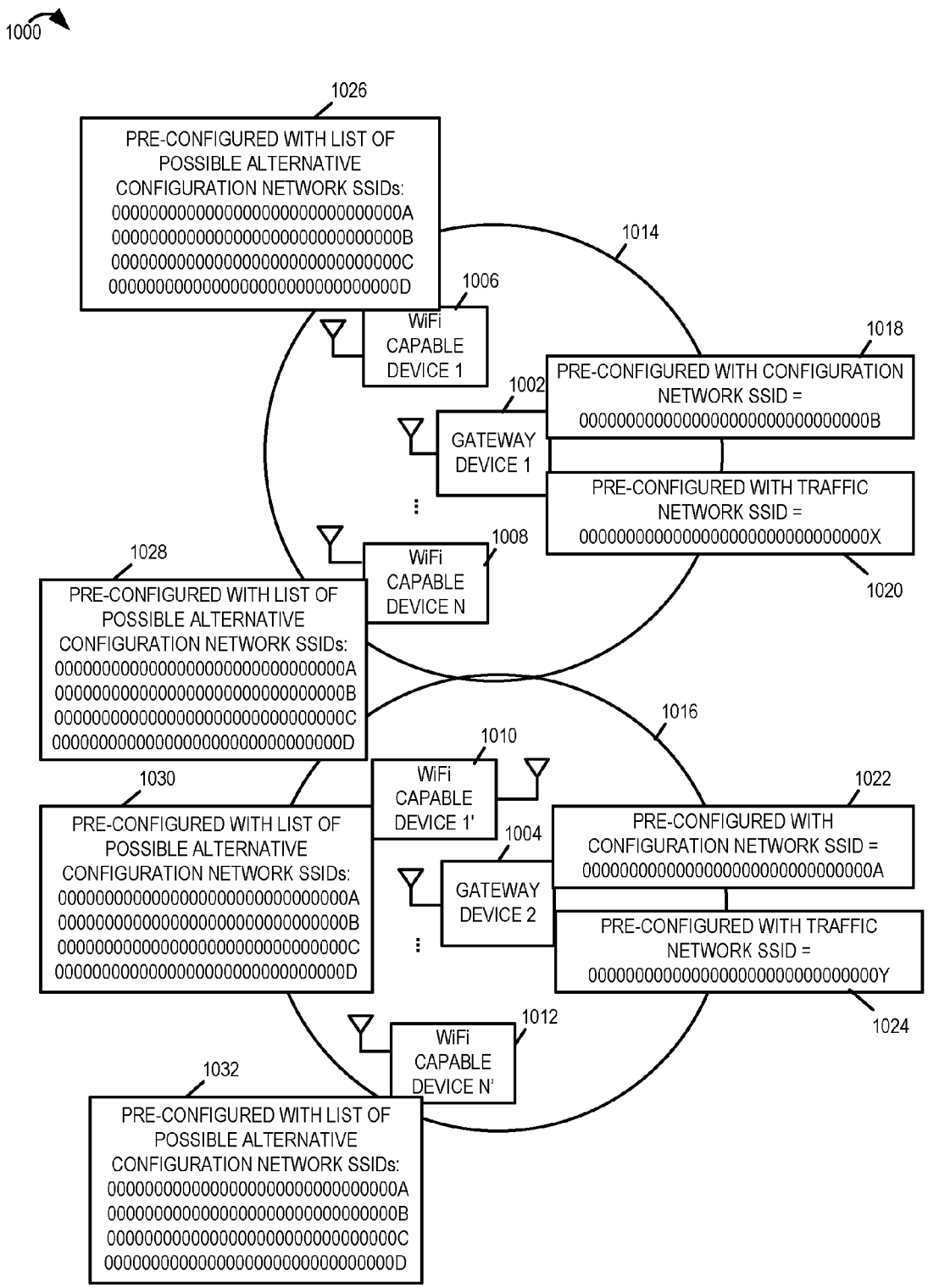
FIG. 10 illustrates adjacent gateway devices, which are each pre-configured for different WiFi configuration networks and different WiFi traffic networks, and a plurality of WiFi capable devices, e.g., WiFi capable client devices, each WiFi capable device pre-configured with a list of alternative WiFi configuration networks that may be used for initial configuration signaling.

FIGS. 10-13 illustrate various features and/or aspects of some exemplary embodiments. Drawing 1000 of FIG. 10 illustrates two exemplary adjacent wireless home gateway devices (gateway device 1 1002, gateway device 2 1004) with corresponding network areas (1014, 1016) respectively. Gateway device 1 1002 has been pre-configured, e.g., prior to shipment to the home site, with a configuration network SSID=00000000000000000000000000000B, as indicated by box 1018, and has been pre-configured, e.g., prior to shipment to the home site, with a traffic network SSID=00000000000000000000000000000000X, as indicated by box 1020. Thus gateway device 1 1002 supports two Wi-Fi wireless networks serving different purposes. Gateway device 2 1004 has been pre-configured, e.g., prior to shipment to the home site, with a configuration network SSID=00000000000000000000000000000000A and has been pre-configured, e.g., prior to shipment to the home site, with a traffic network SSID=00000000000000000000000000000000Y. Thus gateway device 2 1004 supports two Wi-Fi wireless networks serving different purposes.

The adjacent gateway devices (1002, 1004) corresponding to neighboring home sites (1014, 1016), respectively, have been intentionally pre-configured to use different SSIDs.

There are a plurality of WiFi capable devices (WiFi capable device 1 1006, . . . , WiFi capable device N 1008, WiFi capable device 1' 1010, . . . , WiFi capable device N' 1012), which are pre-configured, e.g., at the factory with a list of possible alternative configurations SSIDs: 00000000000000000000000000000000A, 00000000000000000000000000000000B, 00000000000000000000000000000000C, 00000000000000000000000000000000D, as indicated by blocks (1026, 1028, 1030, 1032), respectively. The WiFi capable devices (1026, 1028, 1030, 1032) may be shipped to any one of a plurality of customer sites, e.g., in response to a customer needs at a given time. In this example, WiFi capable devices 1006 and 1008 are shipped to home site 1014 at which gateway device 1 1002 is located. In this example, WiFi capable devices 1010 and 1012 are shipped to home site 1016 at which gateway device 2 1004 is located.

Wireless devices (1006, 1008) determine, e.g., based on signal strength measurements of response signals, to select to use the configuration network with SSID=00000000000000000000000000000000B, from its stored list of alternatives. Wireless devices (1010, 1012) determine, e.g., based on signal strength measurements of response signals, to select to use the configuration network with SSID=00000000000000000000000000000000A, from its stored list of alternatives.

Figure 11:
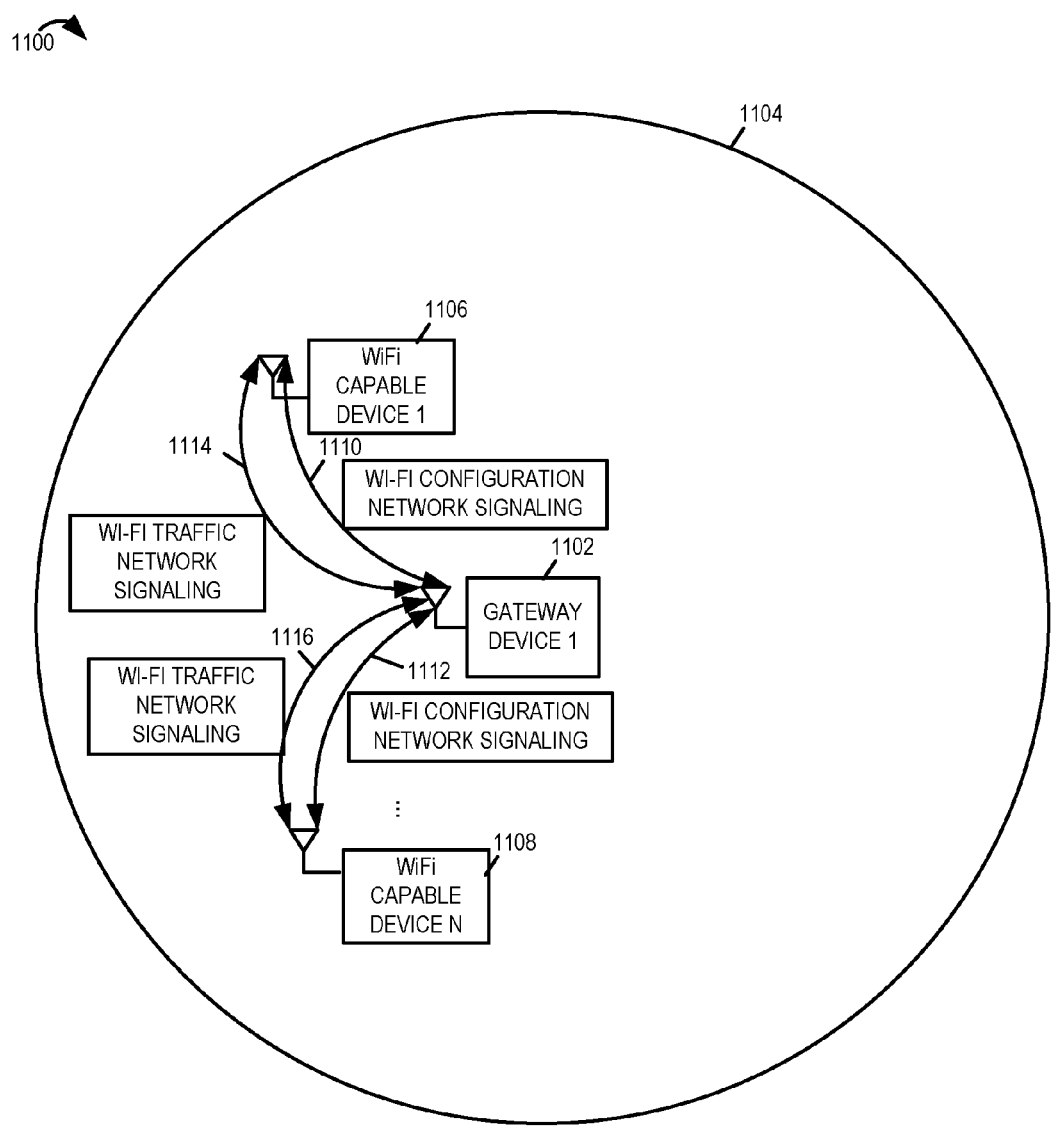
FIG. 11 illustrates an example in which a gateway device at home site uses a first WiFi network for communicating configuration information and a second WiFi network for communicating traffic information, e.g., traffic information corresponding to a service.

Drawing 1100 of FIG. 11 illustrates an example in which gateway device 1 1102 at home site 1104 uses a first WiFi network for communicating configuration information and a second WiFi network for communicating traffic information, e.g., traffic information corresponding to a service. Gateway device 1 1102 communicates WiFi configuration network signaling (1110, 1112) with WiFi capable devices (1106, 1108), respectively over the first WiFi communications network. Gateway device 1 1102 communicates Wi-Fi traffic network signaling (1114, 1116) with WiFi capable devices (1106, 1108), respectively, over the second WiFi communications network.

Figure 12:
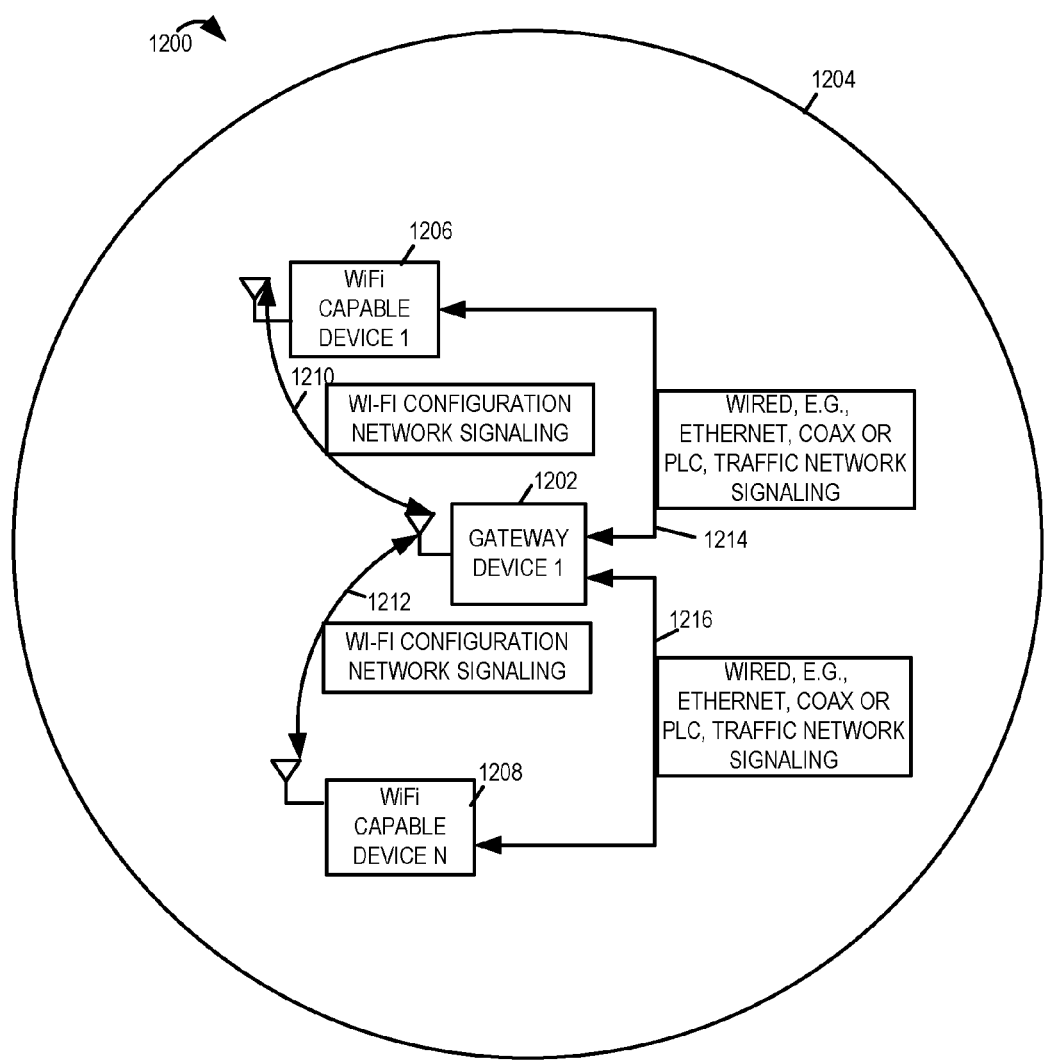
FIG. 12 illustrates an example in which a gateway device at home site uses a first WiFi network for communicating configuration information and a second network, which is a wired network, for communicating traffic information, e.g., traffic information corresponding to a service.

Drawing 1200 of FIG. 12 illustrates an example in which gateway device 1 1202 at home site 1204 uses a first WiFi network for communicating configuration information and a second network, which is a wired network, for communicating traffic information, e.g., traffic information corresponding to a service . Gateway device 1 1202 communicates Wi-Fi configuration network signaling (1210, 1212) with WiFi capable devices (1206, 1208), respectively over the first WiFi communications network. Gateway device 1 1202 communicates wired traffic network signaling (1214, 1216) with WiFi capable devices (1206, 1208), respectively, over the second communications network, which is a wired network. The second communications network is, e.g., one of a Ethernet, coax, power line communications or fiber optic, local communications network deployed at the home site 1204.

Figure 13:
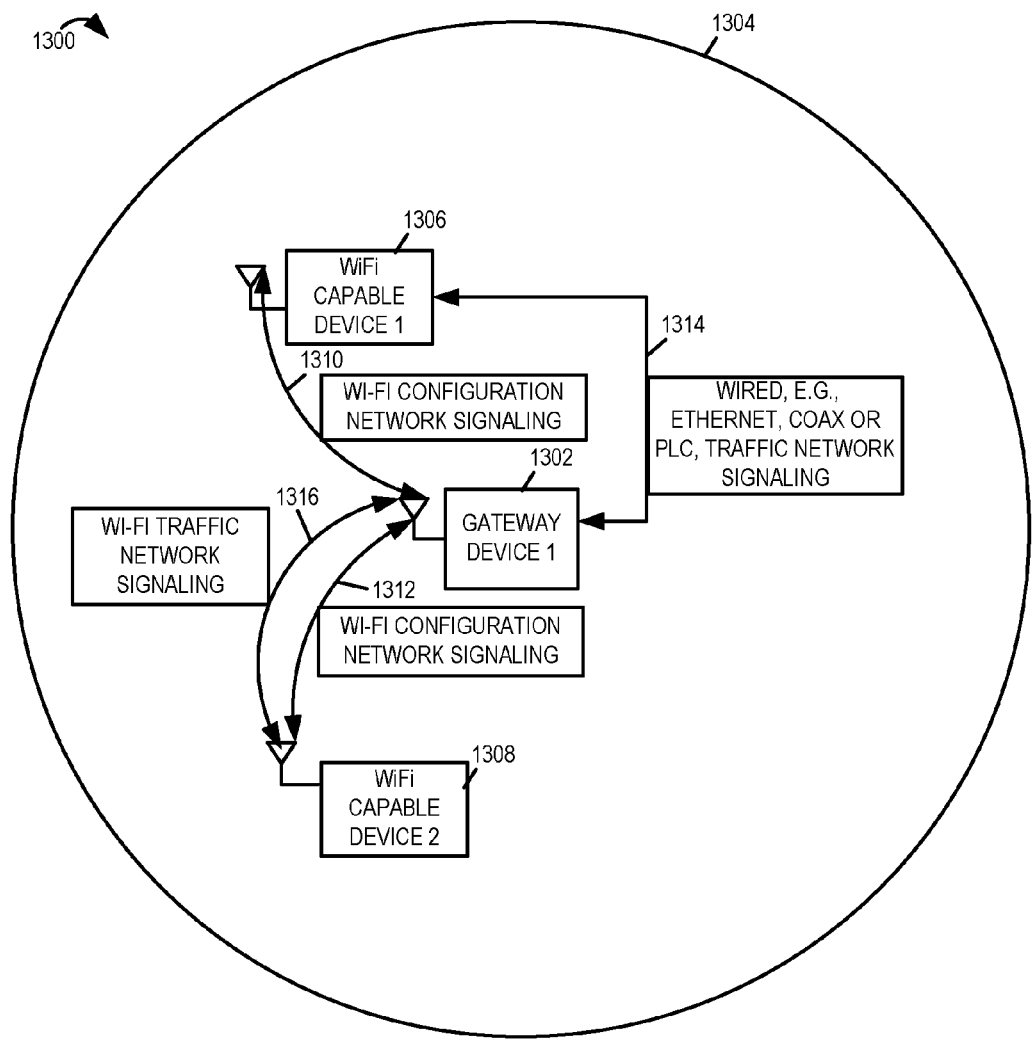
FIG. 13 illustrates an example in which gateway device at home site uses a first WiFi network for communicating configuration information and a second network, which is a wireless WiFi network, for communicating traffic information, e.g., traffic information corresponding to a first service, with some WiFi capable devices, and a third network, which is a wired network, for communicating traffic information, e.g., traffic information corresponding to a second service, with some other WiFi capable devices.

Drawing 1300 of FIG. 13 illustrates an example in which gateway device 1 1302 at home site 1304 uses a first WiFi network for communicating configuration information and a second network, which is a wireless WiFi network, for communicating traffic information, e.g., traffic information corresponding to a first service, with some WiFi capable devices, and a third network, which is a wired network, for communicating traffic information, e.g., traffic information corresponding to a second service, with some other WiFi capable devices. Gateway device 1 1302 communicates WiFi configuration network signaling (1310, 1312) with WiFi capable devices (1306, 1308), respectively over the first WiFi communications network. Gateway device 1 1302 communicates WiFi traffic network signaling 1316 with WiFi capable device 2 1308 over the second WiFi communications network, which has a different SSID than the SSID of the first WiFi network. Gateway device 1 1302 communicates wired traffic network signaling 1314 with WiFi capable device 1306 over the third communications network, which is a wired network. The third communications network is, e.g., one of a Ethernet, coax, power line communications or fiber optic, local communications network deployed at the home site 1304.

Figure 14:
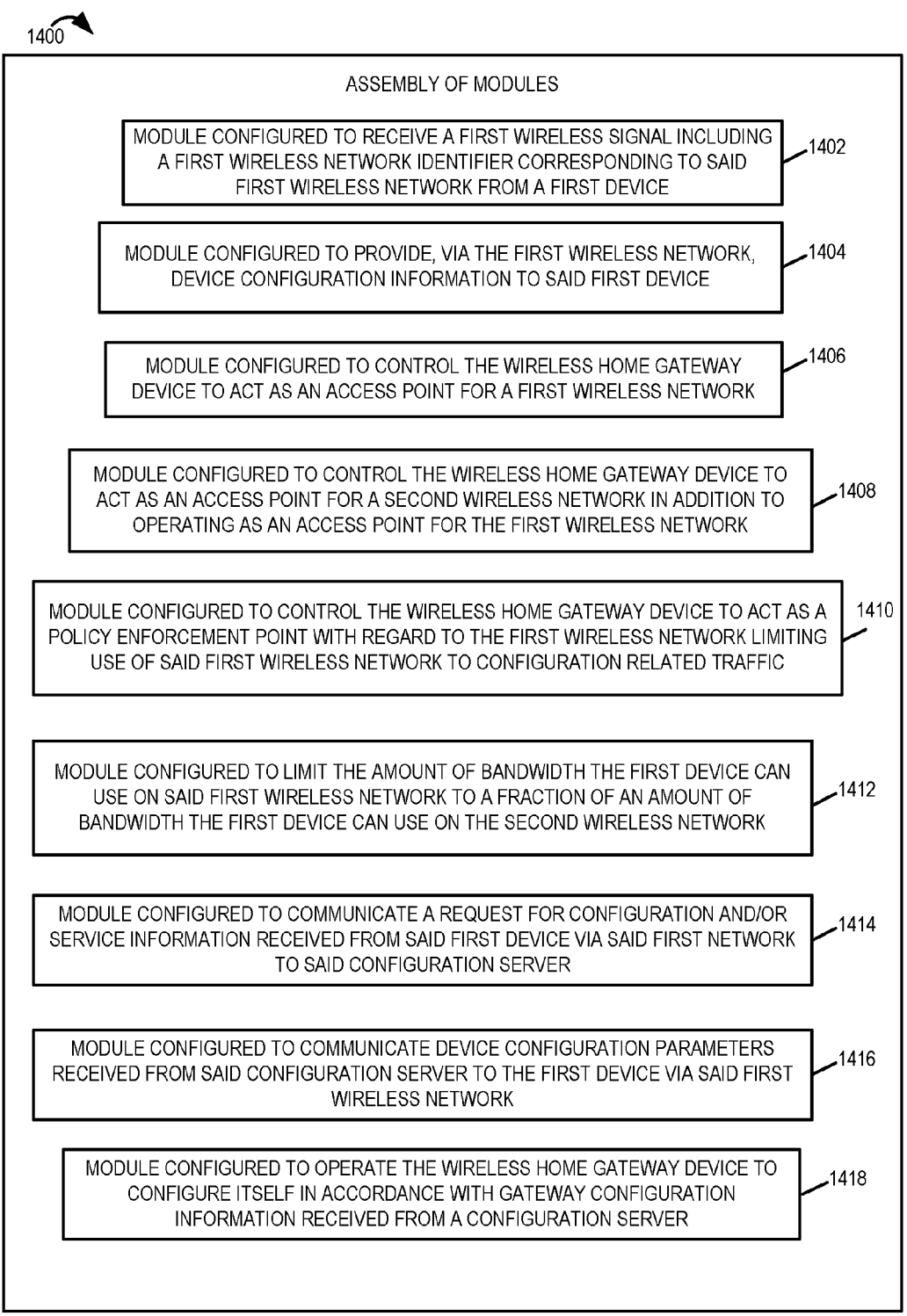
FIG. 14 is a drawing of an assembly of modules that may be used in the wireless home gateway device of FIG. 6.

FIG. 14 illustrates an assembly of modules 1400 which can, and in some embodiments is, used in the wireless home gateway device 600 illustrated in FIG. 6. The wireless home gateway device including assembly of modules 1400 is preconfigured to serve as an access point for a first wireless network used to supply device configuration information. In some embodiments the assembly of modules 1400 can be implemented in hardware within the processor 602 of the wireless home gateway device 600, e.g., as individual circuits. The modules in the assembly 1400 can, and in some embodiments are, implemented fully in hardware within the processor 602, e.g., as individual circuits. In other embodiments some of the modules are implemented, e.g., as circuits, within the processor 602 with other modules being implemented, e.g., as circuits, external to and coupled to the processor. As should be appreciated the level of integration of modules on the processor and/or with some modules being external to the processor may be one of design choice.

Alternatively, rather than being implemented as circuits, all or some of the modules may be implemented in software and stored in the memory 604 of the wireless home gateway device 600, with the modules controlling operation of wireless home gateway device 600 to implement the functions corresponding to the modules when the modules are executed by a processor, e.g., processor 602. In some such embodiments, the assembly of modules 1400 is included in the memory 604 as assembly of modules 620. In still other embodiments, various modules are implemented as a combination of hardware and software, e.g., with another circuit external to the processor providing input to the processor 602 which then under software control operates to perform a portion of a module's function. While shown in the FIG. 6 embodiment as a single processor, e.g., computer, it should be appreciated that the processor 602 may be implemented as one or more processors, e.g., computers.

When implemented in software the modules include code, which when executed by the processor 602, configure the processor 602 to implement the function corresponding to the module. In embodiments where the assembly of modules 1400 is stored in the memory 604, the memory 604 is a computer program product comprising a computer readable medium comprising code, e.g., individual code for each module, for causing at least one computer, e.g., processor 602, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 14 control and/or configure the wireless home gateway device 600 or elements therein such as the processor 602, to perform steps of a method described in FIG. 2 with regard to gateway device 204 and/or functions of the steps illustrated in the method flowchart 300 of FIG. 3 with regard to the wireless home gateway device. Thus the assembly of modules 1400 includes various modules that perform functions of corresponding steps of the method shown in FIG. 3 and/or as described with regard to FIG. 2.

Assembly of modules 1400 includes a module 1402 configured to receive a first wireless signal including a first wireless network identifier corresponding to said first wireless network from a first device, e.g., a WiFi capable device, a module 1404 configured to provide via the first wireless network, device configuration information to the first device, a module 1406 configured to control the wireless home gateway device to act as an access point for a first wireless network, and a module 1408 configured to control the wireless home gateway device to act as an access point for a second wireless network in addition to acting as an access point for the first wireless network.

Assembly of modules 1400 further includes a module 1410 configured to control the wireless home gateway device to act as a policy enforcement point with regard to the first wireless network, limiting use of said first wireless network to use of said first wireless network to configuration related traffic, a module 1412 configured to limit the amount of bandwidth the first device can use on said first wireless network to a fraction of an amount of bandwidth the first device can use on the second wireless network, a module 1414 configured to communicate a request for configuration and/or service information received from said first device, via said first network, to said configuration server, a module 1416 configured to communicate device configuration parameters, e.g., a network identifier to use, a SSID of gateway supported home network to use for traffic data, bandwidth constraint information for traffic channel, information on times to transmit data, etc., received from said configuration server to the first device via the first wireless network, and a module 1418 configured to operate the wireless home gateway device to configure itself in accordance with gateway configuration information received from a configuration server. In some embodiments, the gateway configuration information received from the configuration server includes a service identifier and addressing information to be used by the wireless home gateway device for sending information received from the first device relating to the service to said service provider which provides a function with regard to said service.

In some embodiments, the wireless home gateway device including assembly of modules 1400 is preprogrammed prior to being powered on at the customer premise to act as an access point for one of the network identifiers identified in a list of network identifiers included in a first device, e.g., a WiFi capable device. In various embodiments, the wireless home gateway device including assembly of modules 1400 acts as an access point for a different configuration network than a configuration network supported by another wireless home gateway device located at a customer premise adjacent the customer premise in which said wireless home gateway device is located.

In some embodiments, assembly of modules 1400 further includes one or more or all of the modules includes in assembly of modules 700.

Figure 15:
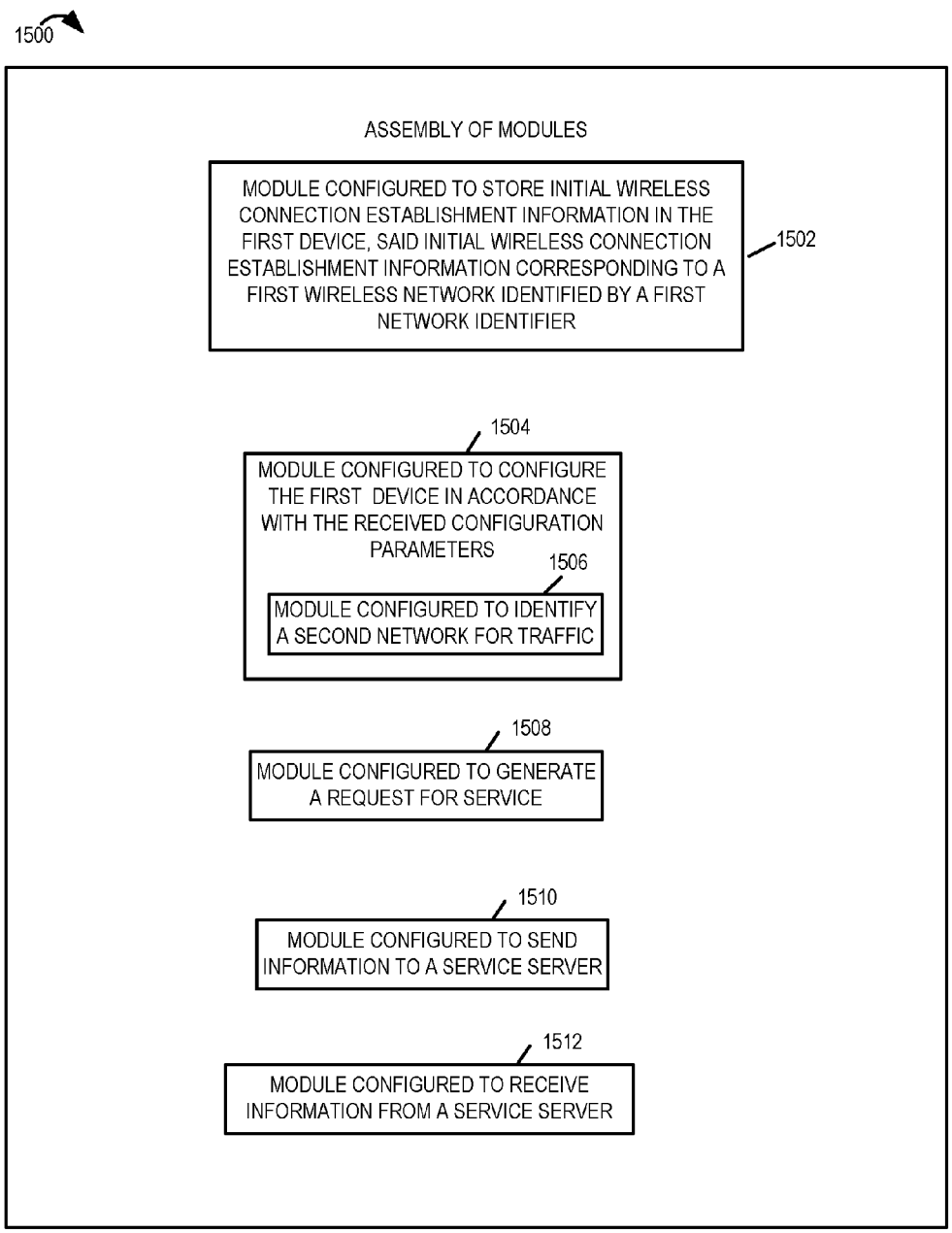
FIG. 15 is a drawing of an assembly of modules that may be used in a first device including wireless capability, e.g., WiFi capable device of FIG. 4.

FIG. 15 illustrates an assembly of modules 1500 which can, and in some embodiments is, used in a first device which supports wireless communications, e.g., the WiFi capable device 400 illustrated in FIG. 4. In some embodiments, the first device including assembly of modules 1500 is a home monitoring device. In some such embodiments, the first device including assembly of modules 1500 is a wireless camera, temperature sensor, window position sensor or door position sensor. In some embodiments the assembly of modules 1500 can be implemented in hardware within the processor 402 of the WiFi capable device 400, e.g., as individual circuits. The modules in the assembly 1500 can, and in some embodiments are, implemented fully in hardware within the processor 402, e.g., as individual circuits. In other embodiments some of the modules are implemented, e.g., as circuits, within the processor 402 with other modules being implemented, e.g., as circuits, external to and coupled to the processor. As should be appreciated the level of integration of modules on the processor and/or with some modules being external to the processor may be one of design choice.

Alternatively, rather than being implemented as circuits, all or some of the modules may be implemented in software and stored in the memory 404 of the WiFi capable device 400, with the modules controlling operation of WiFi capable device 400 to implement the functions corresponding to the modules when the modules are executed by a processor, e.g., processor 426. In some such embodiments, the assembly of modules 1500 is included in the memory 404 as assembly of modules 420. In still other embodiments, various modules are implemented as a combination of hardware and software, e.g., with another circuit external to the processor providing input to the processor 402 which then under software control operates to perform a portion of a module's function. While shown in the FIG. 4 embodiment as a single processor, e.g., computer, it should be appreciated that the processor 402 may be implemented as one or more processors, e.g., computers.

When implemented in software the modules include code, which when executed by the processor 402, configure the processor 402 to implement the function corresponding to the module. In embodiments where the assembly of modules 1500 is stored in the memory 404, the memory 404 is a computer program product comprising a computer readable medium comprising code, e.g., individual code for each module, for causing at least one computer, e.g., processor 402, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 5 control and/or configure the WiFi capable device 400 or elements therein such as the processor 402, to perform steps of a method described in FIG. 2 with regard to WiFi capable device 202 and/or functions of the steps illustrated in the method flowchart 300 of FIG. 3 with regard to the first device. Thus the assembly of modules 1500 includes various modules that perform functions of corresponding steps of the method shown in FIG. 3 and/or as described with regard to FIG. 2.

Assembly of modules 1500 includes a module 1502 configured to store initial wireless connection establishment information in the first device, said initial wireless connection establishment information corresponding to a first wireless network identified by a first network identifier. Assembly of modules 1500 further includes a module 1504 configured to configure the first device in accordance with received configuration parameters, a module 1508 configured to generate a request for service, a module 1510 configured to send information to a service server, e.g., via a second communications network, and a module 1512 configured to receive information from the service server, e.g., via the second communications network. Module 1506 includes a module 1506 configured to identify a second network for traffic.

In some embodiments, the first device including assembly of modules 1500 includes a stored list of wireless network identifiers corresponding to a company which also provides said home gateway device, said initial wireless connection establishment information being stored in the first device prior to the first device being powered on at the customer premise at which the wireless home gateway device is located.

In some embodiments, the first device including assembly of modules 1500 is a WiFi capable device and the first network identifier is a SSID (Service Set identifier) identifying a wireless network used to supply configuration information. In some embodiments, the device configuration information identifies a home network to be used for data traffic corresponding to a service for which the first device is being configured. In some embodiments, the home network is a wired network. In some such embodiments, the wired network is one of an Ethernet or a power line communications network. In some embodiments, the home network is a second wireless network. In some such embodiments, the first and second wireless networks are WiFi networks; and the first wireless network is identified by a first SSID; and the second wireless network is identified by a second SSID, and the first and second SSIDs are different. In some embodiments, the device configuration information further includes information identifying an application server, e.g., an IP address, to which said first device is being configured to transmit information detected by the first device via the second network.

In some embodiments, assembly of modules 1500 further includes one or more or all of the modules includes in assembly of modules 600.

Figure 16:
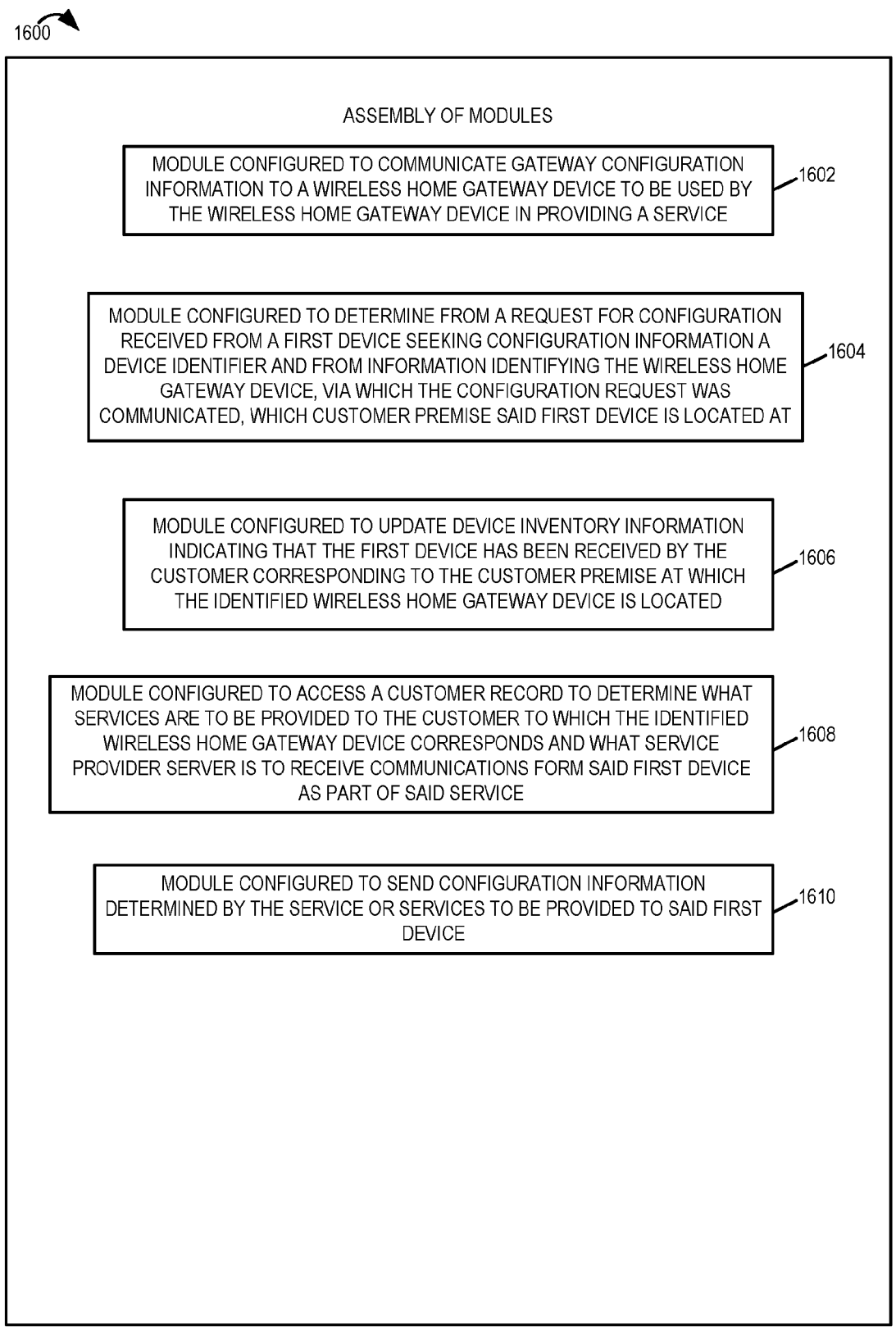
FIG. 16 is a drawing of an assembly of modules that may be used in the configuration server of FIG. 8.

FIG. 16 illustrates an assembly of modules 1600 which can, and in some embodiments is, used in the configuration server 800 illustrated in FIG. 8. In some embodiments the assembly of modules 1600 can be implemented in hardware within the processor 802 of the configuration server 800, e.g., as individual circuits. The modules in the assembly 1600 can, and in some embodiments are, implemented fully in hardware within the processor 802, e.g., as individual circuits. In other embodiments some of the modules are implemented, e.g., as circuits, within the processor 802 with other modules being implemented, e.g., as circuits, external to and coupled to the processor. As should be appreciated the level of integration of modules on the processor and/or with some modules being external to the processor may be one of design choice.

Alternatively, rather than being implemented as circuits, all or some of the modules may be implemented in software and stored in the memory 804 of the configuration server 800, with the modules controlling operation of configuration server 800 to implement the functions corresponding to the modules when the modules are executed by a processor, e.g., processor 802. In some such embodiments, the assembly of modules 1600 is included in the memory 804 as assembly of modules 808. In still other embodiments, various modules are implemented as a combination of hardware and software, e.g., with another circuit external to the processor providing input to the processor 802 which then under software control operates to perform a portion of a module's function. While shown in the FIG. 8 embodiment as a single processor, e.g., computer, it should be appreciated that the processor 802 may be implemented as one or more processors, e.g., computers.

When implemented in software the modules include code, which when executed by the processor 802, configure the processor 802 to implement the function corresponding to the module. In embodiments where the assembly of modules 1600 is stored in the memory 804, the memory 804 is a computer program product comprising a computer readable medium comprising code, e.g., individual code for each module, for causing at least one computer, e.g., processor 802, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 16 control and/or configure the configuration server 800 or elements therein such as the processor 802, to perform steps of a method described in FIG. 2 with regard to initial configuration server 206 and/or functions of the steps illustrated in the method flowchart 300 of FIG. 3 with regard to the configuration server. Thus the assembly of modules 1600 includes various modules that perform functions of corresponding steps of the method shown in FIG. 3 and/or as described with regard to FIG. 2.

Assembly of modules 1600 includes a module 1602 configured to communicate gateway configuration information to a wireless home gateway device to be used by the wireless home gateway device in providing a service, a module 1604 configured to determine from a request for configuration received from a first device seeking configuration information a device identifier, e.g., a device's MAC address, and from information identifying the wireless home gateway device, e.g., a gateway identifier included in the routed configuration request such as a MAC address or IP address being used by the gateway, via which the configuration request was communicated, which customer premise said first device is located at, a module 1606 configured to update device inventory information indicating that the first device has been received by the customer corresponding to the customer premise at which the identified wireless home gateway device is located, a module 1608 configured to access a customer record to determine what services are to be provided to the customer to which the identified wireless home gateway device corresponds and what service provider server is to receive communications from said first device as part of said service, e.g., what type of monitoring services and/or alarms are to be generated, e.g., how often temperature, etc. is to be checked and/or recorded and/or what temperature is to trigger an alarm, and a module 1610 configured to send configuration information determined by the service or services to be provided to said first device.

In some embodiments, assembly of modules 1600 further includes one or more or all of the modules includes in assembly of modules 900.

Figure 17:
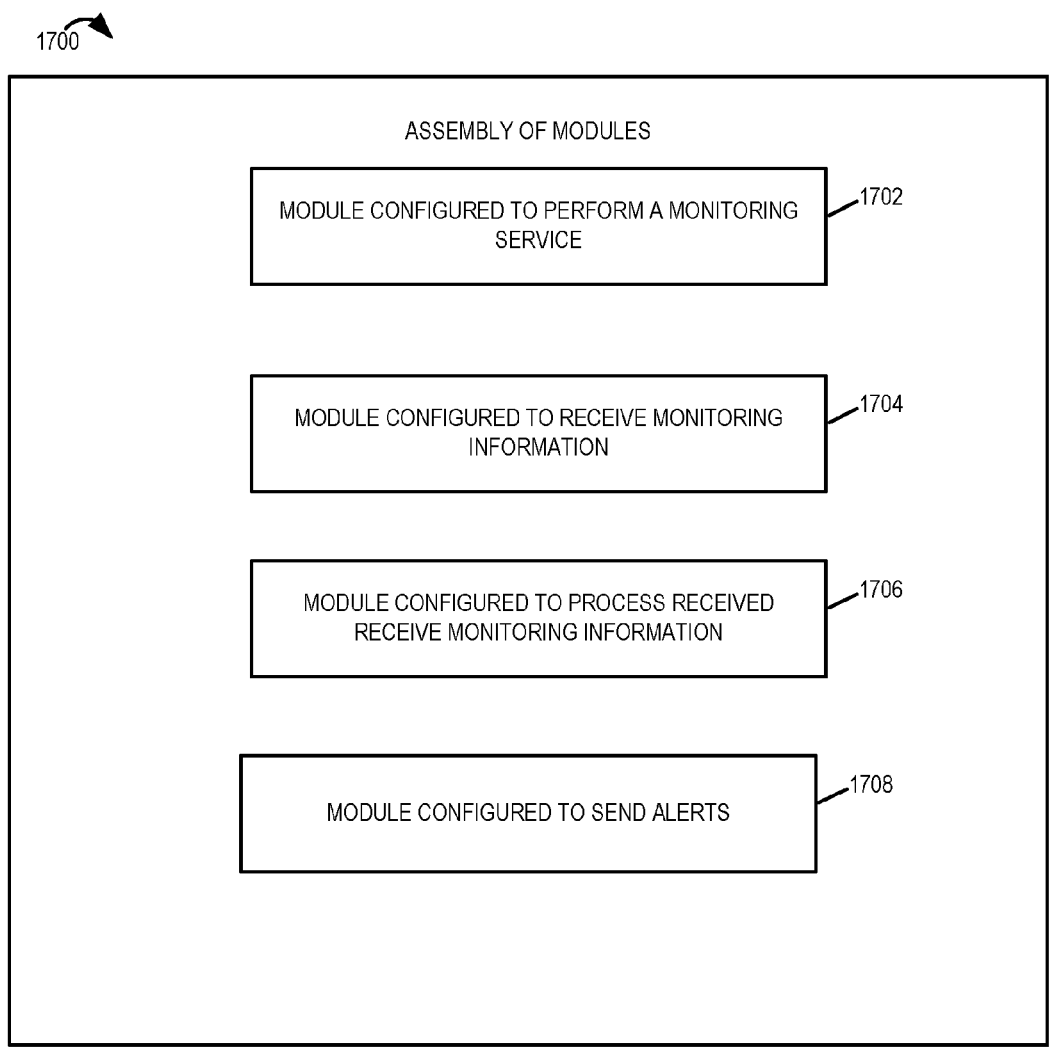
FIG. 17 is a drawing of an assembly of modules that may be used in a service provider server.

FIG. 17 illustrates an assembly of modules 1700 which can, and in some embodiments is, used in a service provider server, e.g., one of service server 128 of FIG. 1, service server 130 of FIG. 1 or service server 208 of FIG. 2. The service provider service includes a processor and memory coupled together. In some embodiments the assembly of modules 1700 can be implemented in hardware within a processor of the service provider server, e.g., as individual circuits. The modules in the assembly 1700 can, and in some embodiments are, implemented fully in hardware within the processor, e.g., as individual circuits. In other embodiments some of the modules are implemented, e.g., as circuits, within the processor with other modules being implemented, e.g., as circuits, external to and coupled to the processor. As should be appreciated the level of integration of modules on the processor and/or with some modules being external to the processor may be one of design choice.

Alternatively, rather than being implemented as circuits, all or some of the modules may be implemented in software and stored in the memory of the service server, with the modules controlling operation of service server to implement the functions corresponding to the modules when the modules are executed by a processor. In some such embodiments, the assembly of modules 1700 is included in the memory of the service server as assembly of modules. In still other embodiments, various modules are implemented as a combination of hardware and software, e.g., with another circuit external to the processor providing input to the processor which then under software control operates to perform a portion of a module's function. While described as a single processor, e.g., computer, it should be appreciated that the processor may be implemented as one or more processors, e.g., computers.

When implemented in software the modules include code, which when executed by the processor, configure the processor to implement the function corresponding to the module. In embodiments where the assembly of modules 1700 is stored in the memory, the memory is a computer program product comprising a computer readable medium comprising code, e.g., individual code for each module, for causing at least one computer, e.g., processor, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 17 control and/or configure the service server or elements therein such as the processor, to perform steps of a method described in FIG. 2 with regard to service server and/or functions of the steps illustrated in the method flowchart 300 of FIG. 3 with regard to the service server. Thus the assembly of modules 1700 includes various modules that perform functions of corresponding steps of the method shown in FIG. 3 and/or as described with regard to FIG. 2.

Assembly of modules 1700 includes a module 1702 configured to perform a monitoring service, e.g., monitors a sensor and/or a camera output and generates alarms, notifies police, notifies the fire department, etc. Assembly of modules 1700 further includes a module 1704 configured to receive monitoring information, a module 1706 configured to process received monitoring information, and a module 1708 configured to send alerts.

Various aspects and/or features of some embodiments are further discussed below. Various embodiments, in accordance with the present invention, make it easier for customers/technicians to connect devices to a Wi-Fi network. Various embodiments, also allow for a managed residential gateway to correctly recognize the connecting device and properly interact with the connecting device, e.g., switch the SSID the device has connected to, grant proper settings for the connection, etc. In addition to simplifying the process of connecting Wi-Fi clients to an access point, various embodiments, also offer a service provider transparent control over QoS parameters, e.g., packet prioritization, bandwidth limiting/reservation, traffic shaping, etc. in a granular manner.

In some embodiments, the hardcoding of an initial SSID in a device eliminates the need for a WPS button and gain simplicity for the user. Once a device were powered on, the would seek out the hard coded SSID and it would eliminate the need to the user to perform manual operations to configure the device.

In some embodiments, when an IP client device, e.g., a Wi-Fi capable client device, is manufactured, it is hard coded with an initial configuration SSID to sign on to when it boots. That SSID can be, and in some embodiments is, in the form of a short URL to direct the IP client to its initial configuration server.

In some embodiments, when the IP client device boots on a WiFi network hosted by a managed residential gateway (RG), e.g., a wireless home gateway device including Wi-Fi capability, that hosts the configuration SSID, that IP client automatically signs on to the configuration SSID. When the IP client signs on to the configuration SSID, the RG uses DHCP to respond with optional configuration parameters, including a URL of the initial configuration server for the managed services. The IP client then uses the WiFi connection to contact the initial configuration server for more information regarding the managed services.

In some embodiments, the configuration SSID is restricted to contact only to initial configuration server(s), and restricted in bandwidth to any one client, to avoid rogue clients trying to use that SSID for internet connectivity.

The initial configuration server delivers information to the IP client regarding through what resources that IP client can find its managed services of interest. Examples of managed services include video, home security reporting, or health monitoring reporting. Examples of resources to enable managed services include moving to a new, managed SSID (with controlled access to managed services, less restricted bandwidth), moving to a new transport like Zigbee or wired Ethernet or MoCA, and URLs/connection points to retrieve the managed services.

In some embodiments, in addition, the initial configuration server, once the IP client connects and requests the managed services, will also direct the RG to modify its configuration to account for a new client of that particular managed service. Examples include firewall modification, bandwidth increase, opening a new SSID, changing channels of a particular SSID, and enabling MoCA.

Examples of the IP client device include an IP STB, IP Camera, IP Health monitor, or an app on a consumer owned device with programmatic control of that device's WiFi client. Examples of the RG include lease-model AWG or MSO-controlled/configured DOCSIS gateway product.

While the invention has been explained in the context of a WiFi (802.11) embodiment, it should be appreciated that the configuration network and the service network don't necessarily have to be WiFi and WiFi is merely exemplary. The configuration network and service network could be any type of wireless network where traffic on one physical medium is segregated logically or physically by the gateway, e.g., based on SSID, VPN, and/or based on RF4CE channels.

While a logical sequencing of the processing steps of the exemplary embodiments of the methods, routines and sub-routines of the present invention have been shown, the sequencing is only exemplary and the ordering of the steps may be varied.

The techniques of various embodiments may be implemented using software, hardware and/or a combination of software and hardware. Various embodiments are directed to apparatus, e.g., a communications system. Various embodiments are also directed to methods, e.g., a method of providing a service, e.g., configuring devices and supporting communications, e.g., with regard to a home or office security system. Various embodiments are also directed to non-transitory machine, e.g., computer, readable medium, e.g., ROM, RAM, solid state storage, silicon storage disks, CDs, hard discs, etc., which include machine readable instructions for controlling a machine to implement one or more steps of a method.

Various features of the present invention are implemented using modules. For example each of the various routines and/or subroutines disclosed may be implemented in one or more modules. Such modules may be, and in some embodiments are, implemented as software modules. In other embodiments the modules are implemented in hardware, e.g., in circuitry, ASICs, ICs, etc. In still other embodiments the modules are implemented using a combination of software and hardware. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, solid state storage device, silicon storage device, etc. to control a machine, e.g., general purpose computer with or without additional hardware, to implement all or portions of the above described methods. Accordingly, among other things, the present invention is directed to a machine readable medium including machine executable instructions for causing a machine, e.g., processor and associated hardware, to perform one or more of the steps of the above described method(s).

Various combinations of steps can be used to implement an exemplary method in accordance with the invention. Various exemplary combinations of steps are contemplated with each combination comprising a method. Exemplary methods will now be described using number and/or numbers with letters to identify various combinations of steps which may be implemented as a method in accordance with the invention.

A first exemplary method of providing a service, referred to as method 1, comprises receiving, at a wireless home gateway device preconfigured to serve as an access point for a first wireless network used to supply device configuration information, a first wireless signal including a first wireless network identifier corresponding to said first wireless network from a first device; and operating said wireless home gateway device to provide, via said first wireless network, device configuration information to said first device. An exemplary method 1A includes the steps of method 1 and further comprises: storing initial wireless connection establishment information in said first device including a wireless interface, said initial wireless connection establishment information corresponding to the first wireless network identified by the first network identifier. In some embodiments of method 1A, referred to as method 1AA, storing initial wireless connection establishment information includes storing a list of wireless network identifiers corresponding to a company which also provides said home gateway, said initial wireless connection establishment information being stored in the first device prior to the first device being powered on at a customer premise at which said wireless home gateway device is located.

In one embodiment of method 1AA, referred to as method 1AB, said wireless home gateway device is preprogrammed prior to being powered on at said customer premise to act as an access point for one of said networks identified on said list of wireless network identifiers. In one embodiment of method 1AB, said wireless home gateway device acts as an access point for a different configuration network than a configuration network supported by another wireless home gateway device located in a customer premise adjacent the customer premise in which said wireless home gateway device is located. In an exemplary method embodiment referred to as method 1AD, the method includes the method of claim 1A, with said first device being a WiFi capable device and with said first network identifier being an SSID (Service Set Identifier) identifying a wireless network used to supply configuration information.

An exemplary method 2, includes the method of method 1A, with said device configuration information including information used to configure said first device for a service which is provided via a different communications network than said first wireless network which is used to supply device configuration information. An exemplary method 3 includes the features of method 2, with said device configuration information identifying a home network to be used for data traffic corresponding to the service for which the first device is being configured.

An exemplary method 4 includes the features of method 3, with said home network being a wired network, said wired network being one of an Ethernet network or a power line network.

An exemplary method 5 includes the features of method 3, with said home network being a second wireless network and the method further comprising operating said wireless home gateway device to operate as an access point for said second wireless network in addition to operating as an access point for said first wireless network.

An exemplary method 6 includes the features of method 5, with said first and second wireless networks being WiFi networks, said first wireless network being identified by a first SSID, said second wireless network being identified by a second SSID.

An exemplary method 7 includes the features of method 6, with said gateway operating as a policy enforcement point with regard to said first wireless network limiting use of said first wireless network to configuration related traffic. An exemplary method 8 includes the features of method 6, with said gateway limiting the amount of bandwidth the first device can use on said first wireless network to a fraction of an amount of bandwidth said first device can use on said second wireless network.

An exemplary method 9 includes the features of method 1A with said first device is a home monitoring device.

An exemplary method 10 includes the features of method 9 with said first device being a wireless camera, temperature sensor, window position sensor, or door position sensor.

An exemplary method 11 includes the features of method 3, with said device configuration information further includes information identifying an application server (e.g., an IP address) to which said first device being configured is to transmit information detected by said first device via the second network.

An exemplary method 13 includes the features of method 1A and further includes operating the wireless home gateway device to communicate a request for configuration and/or service information received from said first device via said first network to a configuration server; and operating the wireless home gateway device to communicate device configuration parameters (e.g., network identifier to use, SSID of traffic of gateway supported home network to use for traffic data, bandwidth constraint information for traffic channel, information on times to transmit data, etc.) received from said configuration server to the first device via said first wireless network.

An exemplary method 14 includes the features of method 13 and further includes operating the configuration server to communicate gateway configuration information to the wireless home gateway device to be used by the wireless home gateway device in providing said service; and operating the wireless home gateway device to configure itself in accordance with the gateway configuration information received from the configuration server, said configuration information including a service identifier and addressing information to be used by said wireless home gateway device for sending information received from said first device relating to said service to a service provider server which provides a function with regard to said service.

An exemplary method 14A includes the features of method 14 with said service provider server performing a monitoring service (e.g., monitors sensor and/or camera output and generates alarms, notifies police, fire department, etc.).

An exemplary method 15 includes the features of method 13 and further includes operating the configuration server to determine from the request for configuration received from the first device seeking configuration information a device identifier (e.g., devices MAC address) and from information identifying the wireless home gateway device (e.g., gateway identifier included in the routed configuration request such as MAC address or IP address being used by the gateway) via which said configuration request was communicated which customer premise said first device is located at; and updating device inventory information indicating that the first device has been received by the customer corresponding to the customer premise at which the identified wireless home gateway device is located.

An exemplary method 16 includes the features of method 15 and further includes accessing a customer record to determine what services are to be provided to the customer to which the identified wireless home gateway device corresponds and what service provider server is to receive communications from said first device as part of said service; (e.g., what type of monitoring services and/or alarms are to be generated, e.g., how often is temperature, etc, to be checked and recorded and/or what temperature is to trigger an alarm) and sending configuration information determined by the service or services to be provided to said first device.

An exemplary system, referred to for purposes of explanation as system 17 comprises a first device which supports wireless communications; and a wireless home gateway device, preconfigured to serve as an access point for a first wireless network used to supply device configuration information, the wireless home gateway device comprising a module configured to receive a first wireless signal including a first wireless network identifier corresponding to said first wireless network from said first device; and a module configured to provide, via said first wireless network, device configuration information to said first device.

An exemplary system referred to as system 17A includes the features of system 17 with said first device comprising a module configured to store initial wireless connection establishment information in said first device, said initial wireless connection establishment information corresponding to the first wireless network identified by the first network identifier.

An exemplary system referred to as system 17AA includes the features of system 17A with said first device includes a stored list of wireless network identifiers corresponding to a company which also provides said home gateway, said initial wireless connection establishment information being stored in the first device prior to the first device being powered on at a customer premise at which said wireless home gateway device is located.

An exemplary system referred to as system 17AB includes the features of system 17AA with said wireless home gateway device is preprogrammed prior to being powered on at said customer premise to act as an access point for one of said networks identified on said list of wireless network identifiers, and wherein said wireless home gateway device further comprising a module configured to control the wireless home gateway device to act as an access point for a first wireless network.

An exemplary system referred to as system 17AC includes the features of system 17AB with said wireless home gateway device acts as an access point for a different configuration network than a configuration network supported by another wireless home gateway device located in a customer premise adjacent the customer premise in which said wireless home gateway device is located.

An exemplary system referred to as system 17AD includes the features of system 17A, with said first device is a WiFi capable device and where said first network identifier is an SSID (Service Set Identifier) identifying a wireless network used to supply configuration information.

An exemplary system referred to as system 18 includes the features of system 17A with said device configuration information including information used to configure said first device for a service which is provided via a different communications network than said first wireless network which is used to supply device configuration information.

An exemplary system referred to as system 19 includes the features of system 18 with said device configuration information identifying a home network to be used for data traffic corresponding to the service for which the first device is being configured.

An exemplary system referred to as system 20 includes the features of system 19 with said home network is a wired network, said wired network being one of an Ethernet network or a power line network.

An exemplary system referred to as system 21 includes the features of system 19 with said home network being a second wireless network, and said wireless home gateway device further comprising: a module configured to control said wireless home gateway device to operate as an access point for said second wireless network in addition to operating as an access point for said first wireless network.

An exemplary system referred to as system 22 includes the features of system 21 with said first and second wireless networks are WiFi networks, said first wireless network being identified by a first SSID, said second wireless network being identified by a second SSID.

An exemplary system referred to as system 23 includes the features of system 22 with said gateway further comprising: a module configured to control said wireless home gateway device to operate as a policy enforcement point with regard to said first wireless network limiting use of said first wireless network to configuration related traffic.

An exemplary system referred to as system 24 includes the features of system 22 with said wireless home gateway device further comprising a module configured to limit the amount of bandwidth the first device can use on said first wireless network to a fraction of an amount of bandwidth said first device can use on said second wireless network.

An exemplary system referred to as system 25 includes the features of system 17A with n said first device being a home monitoring device. An exemplary system referred to as system 26 includes the features of system 25 with said first device being a wireless camera, temperature sensor, window position sensor, or door position sensor.

An exemplary system referred to as system 27 includes the features of system 19 with said device configuration information further includes information identifying an application server to which said first device being configured is to transmit information detected by said first device via the second network.

An exemplary system referred to as system 28 includes the features of system 17A and further includes a configuration server; with said wireless home gateway device further including a module configured to communicate a request for configuration and/or service information received from said first device via said first network to said configuration server; and a module configured to communicate device configuration parameters (e.g., network identifier to use, SSID of traffic of gateway supported home network to use for traffic data, bandwidth constraint information for traffic channel, information on times to transmit data, etc.) received from said configuration server to the first device via said first wireless network.

An exemplary system referred to as system 29 includes the features of system 28 with and further includes a service provider server, with said configuration server including a module configured to communicate gateway configuration information to the wireless home gateway device to be used by the wireless home gateway device in providing said service; and with said wireless home gateway device further including a module configured to operate the wireless home gateway device to configure itself in accordance with the gateway configuration information received from the configuration server, said configuration information including a service identifier and addressing information to be used by said wireless home gateway device for sending information received from said first device relating to said service to said service provider server which provides a function with regard to said service.

An exemplary system referred to as system 29A includes the features of system 29 with said service provider server comprising a module configured to perform a monitoring service.

An exemplary system referred to as system 30 includes the features of system 28 with said configuration server further including a module configured to determine from the request for configuration received from the first device seeking configuration information a device identifier and from information identifying the wireless home gateway device via which said configuration request was communicated which customer premise said first device is located at; and a module configured to update device inventory information indicating that the first device has been received by the customer corresponding to the customer premise at which the identified wireless home gateway device is located.

An exemplary system referred to as system 31 includes the features of system 30 with the configuration server further including: a module configured to access a customer record to determine what services are to be provided to the customer to which the identified wireless home gateway device corresponds and what service provider server is to receive communications from said first device as part of said service; and a module configured to send configuration information determined by the service or services to be provided to said first device.

Numerous additional variations on the methods and apparatus of the various embodiments described above will be apparent to those skilled in the art in view of the above description. Such variations are to be considered within the scope of the invention.

What is claimed is:

1. A method of providing a service, the method comprising:
   storing initial wireless connection establishment information in a first device including a wireless interface, said initial wireless connection establishment information corresponding to a first wireless network used to supply device configuration information, said first wireless network being identified by a first network identifier;
   receiving from the first device, at a wireless home gateway device preconfigured prior to being powered on at a customer premise to serve as an access point for the first wireless network used to supply device configuration information, a first wireless signal including the first wireless network identifier corresponding to said first wireless network, said device configuration information including information used to configure said first device for a service which is provided via a different communications network than said first wireless network, said device configuration information identifying a home network to be used for data traffic corresponding to the service for which the first device is being configured; and
   operating said wireless home gateway device to provide, via said first wireless network, said device configuration information to said first device; and
   wherein said home network is a second wireless network, the method further comprising operating said wireless home gateway device to serve as an access point for said second wireless network in addition to serving as an access point for said first wireless network.

2. The method of claim 1, wherein said first and second wireless networks are WiFi networks, said first network identifier being a first SSID, said second wireless network being identified by a second SSID.

3. The method of claim 2, wherein said wireless home gateway device operates as a policy enforcement point with regard to said first wireless network limiting use of said first wireless network to configuration related traffic.

4. The method of claim 2, wherein said wireless home gateway device limits the amount of bandwidth the first device can use on said first wireless network to a fraction of an amount of bandwidth said first device can use on said second wireless network.

5. The method of claim 1, wherein said first device is a home monitoring device.

6. The method of claim 1,
wherein said wireless home gateway device is located at said customer premise.

7. The method of claim 1, wherein said device configuration information further includes information identifying an application server to which said first device being configured is to transmit information detected by said first device via the second wireless network.

8. The method of claim 1,
wherein said initial wireless connection establishment information is stored in said first device prior to receipt of said first wireless signal;
wherein said first wireless signal is a request for at least one of configuration or service information received from said first device;
wherein the method further comprises:
operating the wireless home gateway device to communicate the request for at least one of configuration or service information received from said first device via said first wireless network to a configuration server; and
wherein operating the wireless home gateway device to provide, via the first wireless network, device configuration information to said first device includes:
operating the wireless home gateway device to communicate device configuration parameters received from said configuration server in response to said request for at least one of configuration or service information to the first device via said first wireless network.

9. The method of claim 8, further comprising:
operating the configuration server to communicate gateway configuration information to the wireless home gateway device to be used by the wireless home gateway device in providing a service via said second wireless network which is different from said first wireless network; and
operating the wireless home gateway device to configure itself in accordance with the gateway configuration information received from the configuration server, said gateway configuration information including a service identifier and addressing information to be used by said wireless home gateway device for sending information received from said first device relating to said service to a service provider server which provides a function with regard to said service.

10. The method of claim 6,
wherein said first signal is a request for configuration information which includes said first network identifier which is stored in said wireless home gateway device prior to said wireless home gateway device being powered at said customer premise; and
wherein said device configuration information provided to said first device is configuration information received from a configuration server to be used in configuring said first device for a service to be supplied over said second wireless network which is different from said first wireless network.

11. The method of claim 9, further comprising:
operating the configuration server to determine from the request for at least one of configuration or service information a device identifier and from information identifying the wireless home gateway device via which said request for at least one of configuration or service information was communicated, which customer premise said first device is located at; and
updating device inventory information indicating that the first device has been received by a customer corresponding to the customer premise at which the identified wireless home gateway device is located.

12. The method of claim 11, further comprising:
accessing a customer record to determine what services are to be provided to the customer to which the identified wireless home gateway device corresponds and what service provider server is to receive communications from said first device as part of said service; and
sending configuration information determined by the service or services to be provided to said first device.

13. The method of claim 1, wherein said first wireless signal is a request for configuration information for the first device, the method comprising:
operating the wireless home gateway device to communicate said request for configuration information to a configuration server; and
operating the configuration server to update device inventory information to indicate that the first device has been received by a customer corresponding to a customer premise at which the wireless home gateway device is located in response to receiving the request for configuration information.

14. A system comprising:
a first device which supports wireless communications, said first device including a wireless interface and stored initial wireless connection establishment information, said initial wireless connection establishment information corresponding to a first wireless network used to supply device configuration information, said first wireless network being identified by a first network identifier; and
a wireless home gateway device, preconfigured prior to being powered on at a customer premise to serve as an access point for the first wireless network used to supply device configuration information to said first device and to receive while at the customer premise, requests for configuration information from said first device, said device configuration information including information used to configure said first device for a service which is provided via a different communications network than said first wireless network which is used to supply device configuration information, said device configuration information identifying a home network to be used for data traffic corresponding to the service for which the first device is being configured; and
a configuration server configured, to respond to a request for configuration information for the first device, received from said wireless home gateway device, with configuration information to be supplied to said first device; and
wherein said home network is a second wireless network, said wireless home gateway device being configured to serve as an access point for said second wireless network in addition to serving as an access point for said first wireless network.

15. The system of claim 14, wherein said configuration server is further configured to update device inventory information to indicate that the first device has been received by a customer corresponding to said customer premise at which the wireless home gateway device is located in response to receiving the request for configuration information for the first device from the wireless home gateway device.

16. The method of claim 1, wherein said first device is a security camera or a temperature monitor.

* * * * *